(12) United States Patent
Altknecht et al.

(10) Patent No.: US 10,600,441 B1
(45) Date of Patent: Mar. 24, 2020

(54) DISC GRIPPER FOR STORAGE DISCS

(71) Applicant: International Business Machines Corporation, Armonk, NY (US)

(72) Inventors: David J. Altknecht, San Jose, CA (US); Donald S. Bethune, San Jose, CA (US); William M. Dyer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/213,145

(22) Filed: Dec. 7, 2018

(51) Int. Cl.
*G11B 17/22* (2006.01)
*G11B 17/08* (2006.01)
*G11B 17/028* (2006.01)

(52) U.S. Cl.
CPC ............ *G11B 17/225* (2013.01); *G11B 17/08* (2013.01); *G11B 17/22* (2013.01); *G11B 17/0284* (2013.01)

(58) Field of Classification Search
CPC ....... G11B 17/08; G11B 17/22; G11B 17/225; G11B 17/0284
See application file for complete search history.

(56) References Cited

U.S. PATENT DOCUMENTS

| | | | |
|---|---|---|---|
| 4,173,427 A * | 11/1979 | Beuch | G11B 17/047 198/468.2 |
| 4,226,570 A | 10/1980 | Holecek et al. | |
| 4,567,584 A | 1/1986 | Kawakami | |
| 4,580,254 A | 4/1986 | Hojyo et al. | |
| 4,589,101 A | 5/1986 | Schatteman et al. | |
| 4,599,716 A | 7/1986 | Shimbo et al. | |
| 4,608,679 A * | 8/1986 | Rudy | G11B 17/225 369/30.31 |
| 4,633,452 A | 12/1986 | Shimbo et al. | |
| 4,695,990 A | 9/1987 | Kawakami | |

(Continued)

FOREIGN PATENT DOCUMENTS

| | | |
|---|---|---|
| CN | 102598136 A | 7/2012 |
| CN | 204149156 U | 2/2015 |

(Continued)

OTHER PUBLICATIONS

Watanabe, A et al., "Optical library system for Long-term preservation with extended error correction coding", Proceedings of the IEEE Symposium on Massive Storage Systems and Technologies, 2013, pp. 1-18, IEEE Computer Society, United States.

(Continued)

*Primary Examiner* — Brian E Miller
(74) *Attorney, Agent, or Firm* — Sherman IP LLP; Kenneth L. Sherman; Steven Laut

(57) ABSTRACT

An apparatus includes a motor configured to drive a driving element within a housing. A pivoting element on a shaft is connected to the housing. The pivoting element is connected to a moveable jaw device and configured to force the moveable jaw device at any given moment towards or away from a face of a storage disc, as the pivoting element pivots about a first axis. A fixed jaw device is connected to the housing. The moveable jaw device and the fixed jaw device form a gripper device configured to clamp a particular portion of opposite first and second surfaces of a storage disc.

19 Claims, 23 Drawing Sheets

(56) References Cited

U.S. PATENT DOCUMENTS

| | | | |
|---|---|---|---|
| 4,815,055 A * | 3/1989 | Fago, Jr. | G11B 17/26 360/98.06 |
| 4,815,057 A | 3/1989 | Miller et al. | |
| 4,831,549 A | 5/1989 | Red et al. | |
| 4,901,172 A | 2/1990 | Nakazawa et al. | |
| 4,989,191 A * | 1/1991 | Kuo | G11B 15/6835 369/30.76 |
| 5,050,020 A * | 9/1991 | Campbell | G11B 15/681 360/71 |
| 5,056,073 A * | 10/1991 | Fitzgerald | G11B 17/28 360/92.1 |
| 5,067,116 A | 11/1991 | Kadrmas | |
| 5,107,475 A | 4/1992 | Serita et al. | |
| 5,123,000 A * | 6/1992 | Fitzgerald | G11B 17/28 360/92.1 |
| 5,136,562 A | 8/1992 | Staar | |
| 5,207,727 A * | 5/1993 | Pearce | B65B 5/068 206/443 |
| 5,236,296 A * | 8/1993 | Ostwald | B25J 9/10 414/280 |
| 5,242,259 A * | 9/1993 | Yeakley | B25J 15/00 294/86.4 |
| 5,253,911 A * | 10/1993 | Egan | B25J 9/109 294/116 |
| 5,274,620 A | 12/1993 | Sipos | |
| 5,289,441 A | 2/1994 | Domberg et al. | |
| 5,292,222 A | 3/1994 | Malagrino et al. | |
| 5,303,214 A * | 4/1994 | Kulakowski | G11B 17/225 235/385 |
| 5,335,218 A | 8/1994 | Osada | |
| 5,481,514 A | 1/1996 | Yamasaki et al. | |
| 5,528,566 A | 6/1996 | McGee et al. | |
| 5,544,148 A | 8/1996 | Nakamichi | |
| 5,550,801 A | 8/1996 | Enomoto et al. | |
| 5,555,239 A | 9/1996 | Takai et al. | |
| 5,586,094 A | 12/1996 | Pines et al. | |
| 5,588,796 A * | 12/1996 | Ricco | B25J 9/1679 294/100 |
| 5,610,902 A * | 3/1997 | Childers | G11B 17/047 720/720 |
| 5,631,785 A * | 5/1997 | Dang | G11B 15/6835 360/92.1 |
| 5,666,337 A * | 9/1997 | Dang | G11B 15/6835 360/92.1 |
| 5,684,654 A * | 11/1997 | Searle | G11B 15/6815 360/92.1 |
| 5,715,230 A | 2/1998 | Choi et al. | |
| 5,726,967 A | 3/1998 | Tanaka et al. | |
| 5,729,524 A | 3/1998 | Pines | |
| 5,734,629 A * | 3/1998 | Lee | G11B 7/26 369/30.34 |
| 5,754,519 A * | 5/1998 | Bando | G11B 17/28 369/30.85 |
| 5,764,617 A | 6/1998 | Furusawa et al. | |
| 5,798,998 A | 8/1998 | Fukushima | |
| 5,805,561 A * | 9/1998 | Pollard | G11B 17/225 360/92.1 |
| 5,818,802 A * | 10/1998 | Menke | G11B 17/225 369/30.55 |
| 5,848,872 A * | 12/1998 | Manes | G11B 15/6835 414/753.1 |
| 5,923,638 A | 7/1999 | Watanabe | |
| 5,943,306 A | 8/1999 | Silverstein et al. | |
| 5,953,293 A | 9/1999 | Kajiyama et al. | |
| 5,959,958 A | 9/1999 | Inatani et al. | |
| 5,978,323 A | 11/1999 | Nakamura | |
| 6,016,291 A * | 1/2000 | Joos | G11B 15/6835 369/30.43 |
| 6,064,544 A * | 5/2000 | Wada | G11B 15/6835 360/92.1 |
| 6,084,832 A | 7/2000 | Furusawa et al. | |
| 6,122,231 A | 9/2000 | Watanabe et al. | |
| 6,178,153 B1 | 1/2001 | Cho et al. | |
| 6,212,139 B1 | 4/2001 | Nakamura et al. | |
| 6,301,218 B1 * | 10/2001 | Jones | G11B 15/68 360/92.1 |
| 6,373,796 B1 | 4/2002 | Herring et al. | |
| 6,454,509 B1 * | 9/2002 | Kappel | G11B 15/6835 360/92.1 |
| 6,493,178 B1 * | 12/2002 | Brace | G11B 15/6825 360/92.1 |
| 6,587,405 B1 | 7/2003 | Klein | |
| 6,683,827 B1 | 1/2004 | Omoto et al. | |
| 6,731,455 B2 | 5/2004 | Kulakowski et al. | |
| 6,802,070 B2 * | 10/2004 | Britz | G11B 17/10 369/30.55 |
| 6,826,008 B2 * | 11/2004 | Paulat | G11B 15/6885 360/92.1 |
| 7,145,841 B1 | 12/2006 | Miller | |
| 7,193,810 B2 * | 3/2007 | Dickey | B25J 13/088 360/92.1 |
| 7,212,375 B2 * | 5/2007 | Dickey | B25J 15/0206 360/96.4 |
| 7,234,913 B2 * | 6/2007 | Heiland | H01L 21/68707 294/116 |
| 7,673,309 B2 | 3/2010 | Douglass et al. | |
| 7,777,985 B2 | 8/2010 | Barkley | |
| 8,041,449 B2 | 10/2011 | Noble | |
| 8,042,123 B2 | 10/2011 | Terzis et al. | |
| 8,134,799 B1 * | 3/2012 | Ostwald | G11B 15/6835 360/92.1 |
| 8,276,170 B2 | 9/2012 | Douglass et al. | |
| 8,281,327 B2 | 10/2012 | Goto et al. | |
| 8,341,653 B2 | 12/2012 | Terzis et al. | |
| 8,385,163 B2 | 2/2013 | Goyal et al. | |
| 8,528,952 B2 * | 9/2013 | Ostwald | G11B 15/6835 294/192 |
| 8,701,862 B2 | 4/2014 | Takasawa et al. | |
| 8,824,250 B2 | 9/2014 | Yoo | |
| 8,899,406 B2 * | 12/2014 | Nespeca | G11B 15/68 198/468.6 |
| 9,230,591 B2 * | 1/2016 | Kinoshita | G11B 17/22 |
| 9,428,336 B2 | 8/2016 | Hagen et al. | |
| 9,633,686 B1 | 4/2017 | Altknecht et al. | |
| 9,672,863 B1 * | 6/2017 | Altknecht | G11B 17/0284 |
| 9,741,389 B1 | 8/2017 | Altknecht et al. | |
| 9,741,390 B1 * | 8/2017 | Altknecht | G11B 17/225 |
| 10,186,295 B2 * | 1/2019 | Altknecht | G11B 17/0284 |
| 2002/0044504 A1 | 4/2002 | Kabasawa | |
| 2003/0117938 A1 | 6/2003 | Braitberg et al. | |
| 2004/0080852 A1 * | 4/2004 | Jenkins | G11B 23/00 360/69 |
| 2004/0236465 A1 | 11/2004 | Bukta et al. | |
| 2005/0007896 A1 | 1/2005 | Haas | |
| 2006/0005209 A1 | 1/2006 | Chiang | |
| 2006/0021896 A1 | 2/2006 | Cleathero et al. | |
| 2006/0136950 A1 * | 6/2006 | Eberdorfer | G11B 17/056 720/652 |
| 2007/0127323 A1 | 6/2007 | Owens | |
| 2013/0256164 A1 | 10/2013 | Haggard | |
| 2016/0090240 A1 | 3/2016 | Best et al. | |
| 2017/0232619 A1 | 8/2017 | Altknecht et al. | |
| 2019/0130939 A1 | 5/2019 | Altknecht et al. | |

FOREIGN PATENT DOCUMENTS

| | | |
|---|---|---|
| EP | 924698 A2 | 6/1999 |
| EP | 1653461 A2 | 3/2006 |
| WO | 2010005624 A1 | 1/2010 |
| WO | 2014076978 A1 | 5/2014 |

OTHER PUBLICATIONS

International Search Report and Written Opinion dated Apr. 28, 2017 for International Application No. PCT/IB2017/0505592, pp. 1-12, State Intellectual Property Office of the P.R. China, Beijing, China.

(56) References Cited

OTHER PUBLICATIONS

Fujie, R. et al., "6 Disc In-dash CD Changer Deck", Fujitsu Ten Tech. J., No. 14, 2000, pp. 1-8, downloaded from: https://www.denso-ten.com/business/technicaljournal/pdf/14-1.pdf.
Patent Applications, Smith, D. F. et al., U.S. Appl. No. 16/693,064, filed Nov. 22, 2019.

* cited by examiner

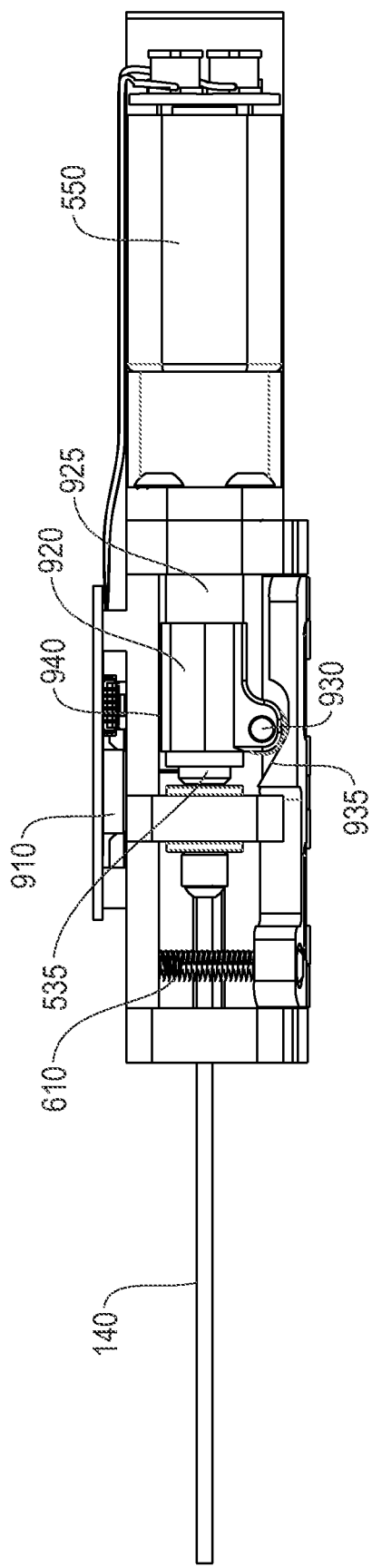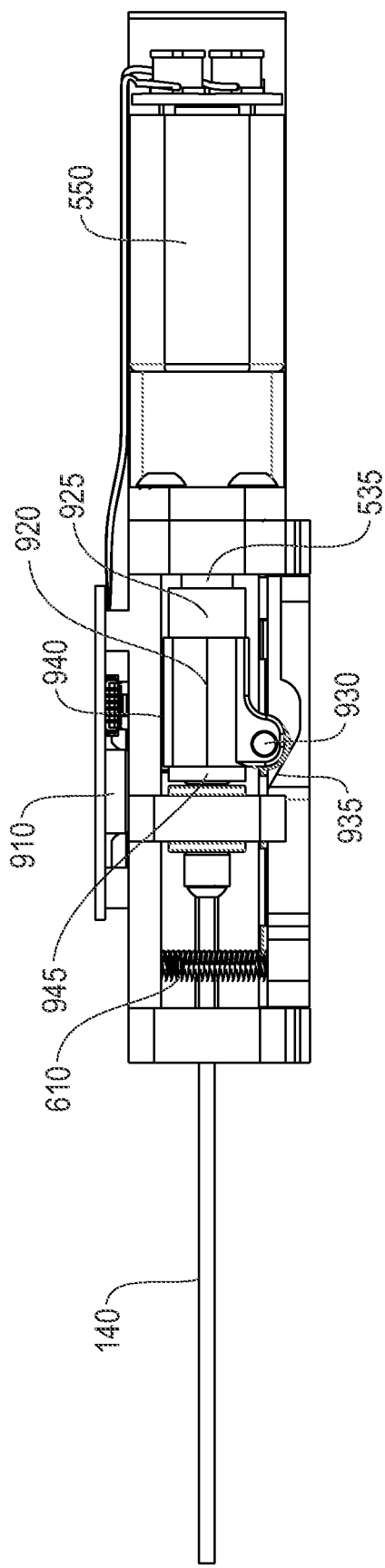
FIG. 9A
FIG. 9B

DISC GRIPPER FOR STORAGE DISCS

BACKGROUND

Disc libraries require a disc retrieval unit (DRU) to move discs between storage locations and the drives that read and write the data on the discs. This DRU must incorporate means to obtain a disc at a pickup location and release the disc at its destination location.

SUMMARY

One or more embodiments relate to transport of storage discs in disc storage systems. In one embodiment, an apparatus includes a motor configured to drive a driving element within a housing. A pivoting element on a shaft is connected to the housing. The pivoting element is connected to a moveable jaw device and configured to force the moveable jaw device at any given moment towards or away from a face of a storage disc, as the pivoting element pivots about a first axis. A fixed jaw device is connected to the housing. The moveable jaw device and the fixed jaw device form a gripper device configured to clamp a particular portion of opposite first and second surfaces of a storage disc.

These and other features, aspects and advantages of the embodiments will become understood with reference to the following description, appended claims and accompanying figures.

BRIEF DESCRIPTION OF THE DRAWINGS

FIG. 9A shows a cutaway top view of the disc gripper device shown in a closed state with a disc, according to an embodiment;

FIG. 9B shows a cutaway top view of the disc gripper device shown in an open state with a disc, according to an embodiment;

DETAILED DESCRIPTION

Figure 1:
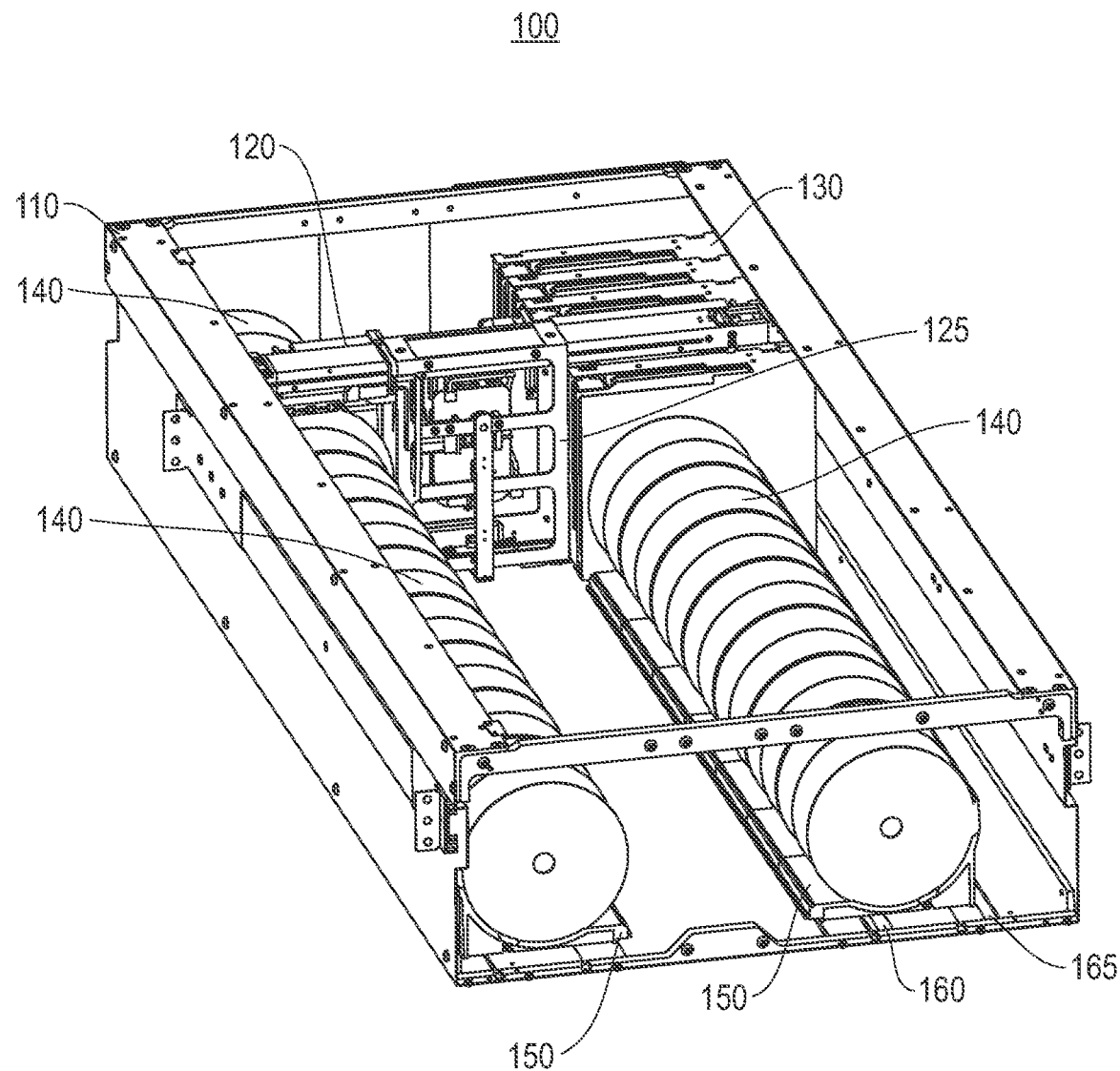
FIG. 1 is a high performance optical storage system that may implement a disc gripper device, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

One or more embodiments include a disc gripper device that contacts a storage disc (e.g., an optical disc, etc.) only over a limited angular range in a narrow band near its outer edge. This allows the disc gripper to hold the disc until a disc retrieval unit (DRU) positions it in the desired location, such as a disc drive, a disc holder (e.g., a disc cassette), etc. In one embodiment, the disc gripper device maintains its hold on a disc in the absence of applied power and holds the disc securely enough to allow it to be accelerated rapidly. The disc gripper device further includes features to enable sensing the presence or absence of a disc.

One or more embodiments provide a disc gripper device for use in a disc library that holds a single disc as it is moved (without cartridge or other containing structure) directly between a library storage location and the hub of an appropriate disc drive. In one example, the disc gripper has a pair of jaw devices that clamp opposite surfaces of a storage disc within 2 mm or less of the disc outer edge, over an angular sector of less than 45° (as measured from the disc center). In one embodiment, a disc gripper device has one movable jaw and one fixed jaw, with the grip actuated by pivoting a caliper (pivoting element or rocker element) about an axis parallel to the fixed jaw disc contact surface. In one embodiment, a lead screw drives a movable unit with a roller, which presses against a ramp surface of the caliper causing the caliper to rotate and move the movable jaw towards a disc. In one embodiment, when the lead screw moves the roller away from the ramp surface of the caliper, the caliper is rotated to its open position by a return spring, which moves the movable jaw away from the disc and releases the disc. In one embodiment, the caliper uses a polished pivot shaft and has low friction for actuation motions. The movable jaw is coupled to the caliper by a shaft that allows it to pivot through a small angle about an axis parallel to the caliper pivot axis, allowing the movable jaw's grip-surface to align parallel to the gripped disc face. A pin protruding from the disc gripper device body wall engages a groove in the movable roller unit to prevent the unit from rotating around the lead screw axis. In one embodiment, the disc gripper device uses separate jaw and rocker parts, coupled by a shaft. An alternative implementation uses a single piece rocker/jaw combination that has a rocker portion and a jaw portion connected by a flexure portion. In one embodiment, the single piece may be made of an injection moldable polymer.

In one embodiment, once the moveable and fixed jaw are gripping a storage disc, it is held tightly with no current supplied to a drive motor. To release a storage disc, the drive motor is reversed, and the moveable jaw is positively driven to release/open the moveable jaw from the storage disc.

In one example embodiment, a disc sensor limits the depth to which a disc can enter, and the sensor indicates the presence or absence of a disc. In other examples, alternative sensor arrangements are possible, such as the disc itself interrupts or reflects an optical beam, or contacts and actuates a switch to indicate the presence or absence of a disc in the disc gripper device.

FIG. 1 is a high performance optical storage system 100 that may implement a disc gripper device (e.g., disc gripper device 200 (FIG. 2), 500 (FIGS. 5A-B) or 700 (FIG. 7)), according to an embodiment. In one embodiment, the high performance optical storage system 100 includes an enclosure 110, a moveable arm 120 connected to a DRU 125 that includes a disc gripper device, multiple optical disc drives 130, multiple optical disc-based media (discs) 140, disc cassettes 150, and tracks 160 and 165 that hold the disc cassettes 150 in place. In one embodiment, the enclosure 110 provides a stable platform and protection from the environment. In one example, the enclosure includes filter material connected to cooling fans (not shown) and a top enclosure (not shown for internal viewing). In one embodiment, the enclosure may be sized as a typical 19-inch rack mounted device with rack mounting connectors. Depending on the space and enclosure size chosen, the enclosure 110 may have a greater capacity of optical disc drives 130, disc cassettes 150, and thus, discs 140. In one example, the disc cassettes 150 are placed within the enclosure 110 on either side (e.g., left and right sides) of the enclosure 110. In one example, additional disc cassettes 150 and discs 140 space is available adjacent the disc drives 130 (e.g., towards the front of the enclosure 110). In wider enclosures 110, more disc drives 130 may be positioned adjacent each other on the left and right side of the enclosure 110 when more available space for disc drives 130 is available. In one embodiment, the moveable arm 120 moves using motors and gears on tracks within the enclosure 110 to move the DRU 125 from the back of the enclosure 110 to the front of the enclosure 110. The gripper device included in the DRU 125 is moveable to either side of the enclosure 110, allowing it to retrieve a disc 140 for placement in a disc drive 130 or for replacement back into a disc cassette 150. In other embodiments, other configurations of stored discs 140, disc drives 130 and the DRU 125 may be used for employment of the disc gripper device for disc placement, transport and loading (e.g., into a disc drive 130, into a disc holder or cassette 150), etc.

Figure 2:
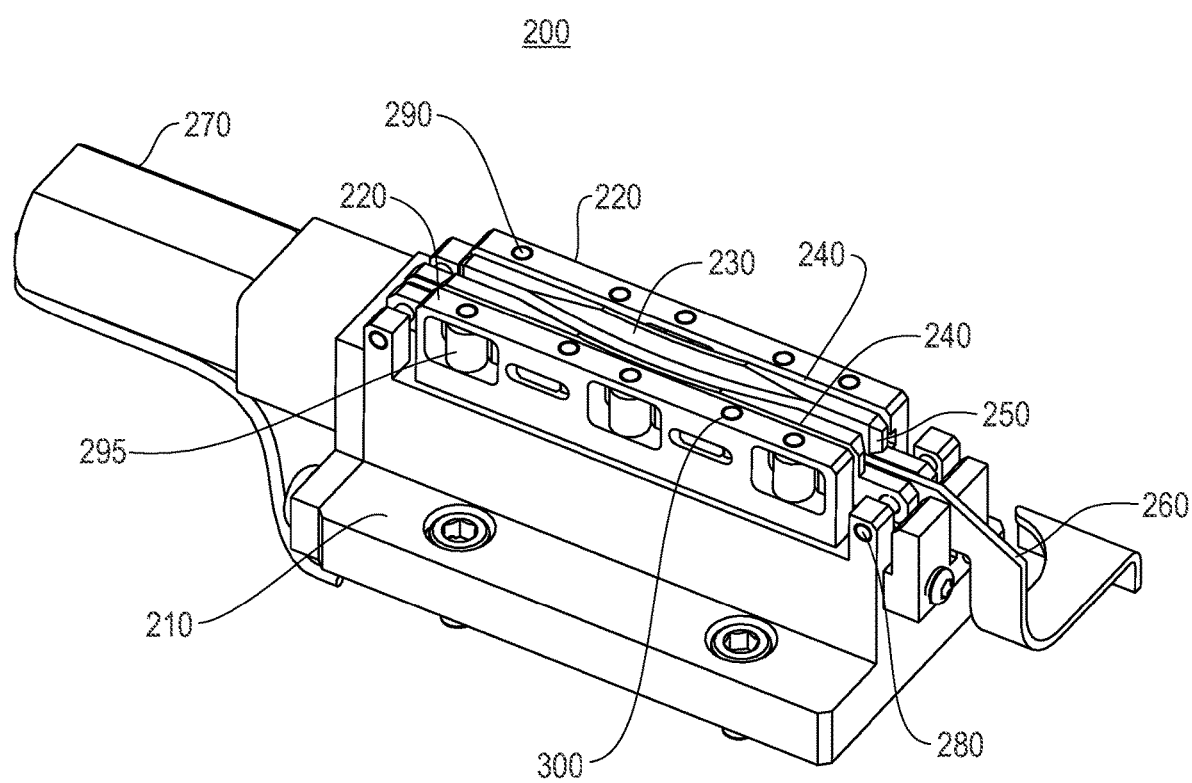
FIG. 2 shows a disc gripper device.
Figure 3:
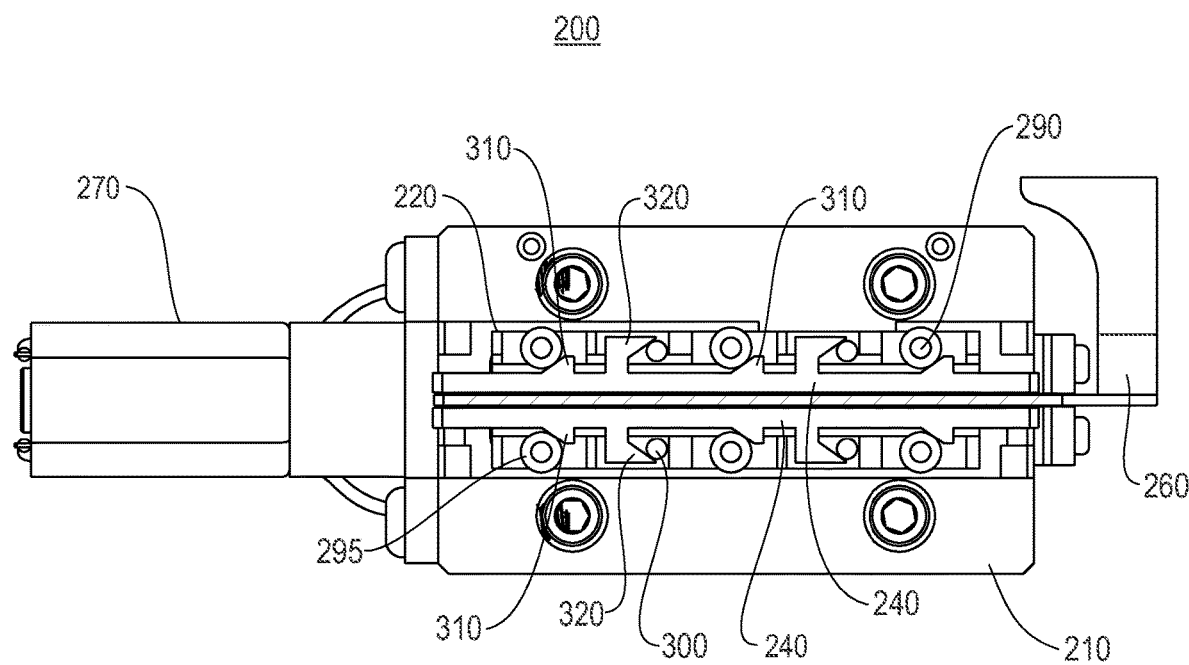
FIG. 3 shows a bottom cross-sectional view of the disc gripper device of FIG. 2.

FIG. 2 shows a disc gripper device 200. The disc gripper device 200 includes a housing or body 210, a caliper 220, a vertical jaw device chamfer 230, a pair of jaw devices 240, a lateral jaw device chamfer 250, a disc sensor lever 260, a motor 270, guide pin(s) 280, caliper roller pins 290 and caliper rollers 295 that rotate about them, and jaw opening pins 300 that are used to drive the jaw devices 240 open when they contact the jaw-opening ramp elements 320 (FIG. 3). The pair of jaw devices 240 are shaped to contact only a thin sector close to the edge of a storage disc 410 (FIG. 4), slide towards or away from each other on the pair of guide pins 280 supported by the disc gripper housing 210. The jaw devices 240 are driven closer together by the calipers 220 incorporating caliper rollers 295 on each side that contact ramps 310 (FIG. 3) on the outer surfaces of the jaw devices 240. The position of the storage disc in the jaw devices 240 is limited by a storage disc (e.g., storage disc 140, FIG. 1, storage disc 410, FIG. 4) contacting and moving the disc sensor lever 260. The position of the storage disc in the jaw devices 240 is limited by a storage disc (e.g., storage disc 140, FIG. 1, storage disc 410, FIG. 4) contacting the inner vertical edges (vertical jaw device chamfer 230) and lateral edges (lateral jaw device chamfer 250) of the disc gripper device 200 jaw devices 240, the chamfers serving to guide and align entering storage discs (e.g., storage disc 140, FIG. 1, storage disc 410, FIG. 4).

FIG. 3 shows a bottom cross-sectional view of the disc gripper device 200 of FIG. 2. As shown, the disc gripper device 200 includes the contact ramps 310 and jaw-opening ramp elements 320. When the motor 270 is powered, the drive element 420 (e.g., a drive screw) (FIG. 4) is caused to move, which moves the caliper 220 further from the motor 270 and causes the caliper rollers 295 to contact the jaw-device contact ramps 310. This movement forces the jaw devices 240 to move toward one another for clamping a storage disc (e.g., storage disc 140, FIG. 1, storage disc 410, FIG. 4). Both jaw devices can be moved towards each other or one jaw device can be fixed as the other jaw device is moved towards the other. The irreversible nature of the drive element 420 (e.g., a drive screw) (FIG. 4) sustains the clamping position of jaw devices 240. When the motor is powered to move the calipers 220 towards the motor 270, the force on the contact ramps 310 from the caliper rollers 295 is removed, and the jaw-opening pins 300 contact ramps 320, causing the jaw devices 240 to separate and release a clamped storage disc (e.g., storage disc 140, FIG. 1, storage disc 410, FIG. 4). Therefore, it can be seen that when a storage disc is clamped, no power is required to maintain the jaw devices 240 clamping a storage disc.

Figure 4:
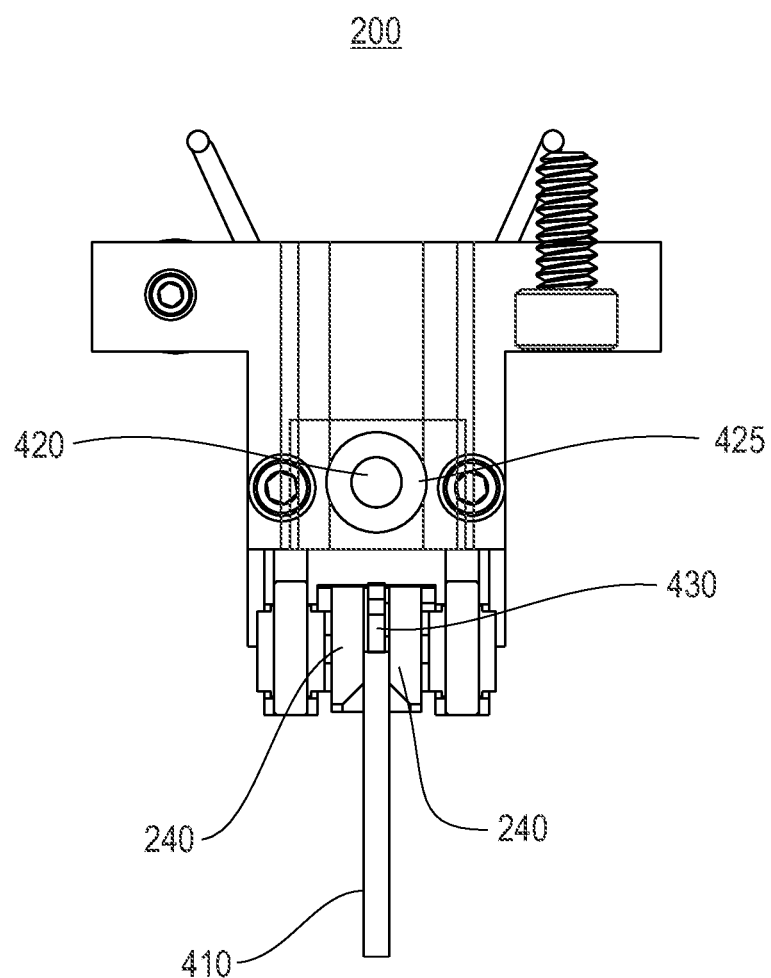
FIG. 4 shows an end-on cross-sectional view of the disc gripper device of FIG. 2.

FIG. 4 shows a cross sectional view of the disc gripper device 200 of FIG. 2. As shown, the jaw devices 240 are closed on a storage disc 410. In one embodiment, the jaw devices 240 contact only the outermost 1.5 mm of the storage disc 410. The depth of disc 410 in the disc gripper device 200 is limited by the disc sensor lever 260 portion 430 between the jaw devices 240. Also shown is the drive element 420 and a support bearing 425.

The disc gripper device 200 has some problems, namely the disc gripper device 200 uses a sliding caliper 220 with a set of caliper rollers 295 that press against wedged surfaces 310 on the back surface of one or both of the two jaw devices 240 that press against the sides of the disc 140 to hold it. The sliding caliper 220 has a complicated shape and incorporates multiple rollers 295 that must be accurately aligned with each other and contact and press evenly on the jaw device ramps 310 on the back of one or both jaw devices 240, and at least one jaw device 240 in turn must slide along a pair of shafts at its ends to maintain its alignment. These sliding part motions have considerable friction, causing wear, increasing the strain on the motor 270 and gear transmission, and increasing the uncertainty in how much grip force is being applied to the disc 140.

Figure 5A:
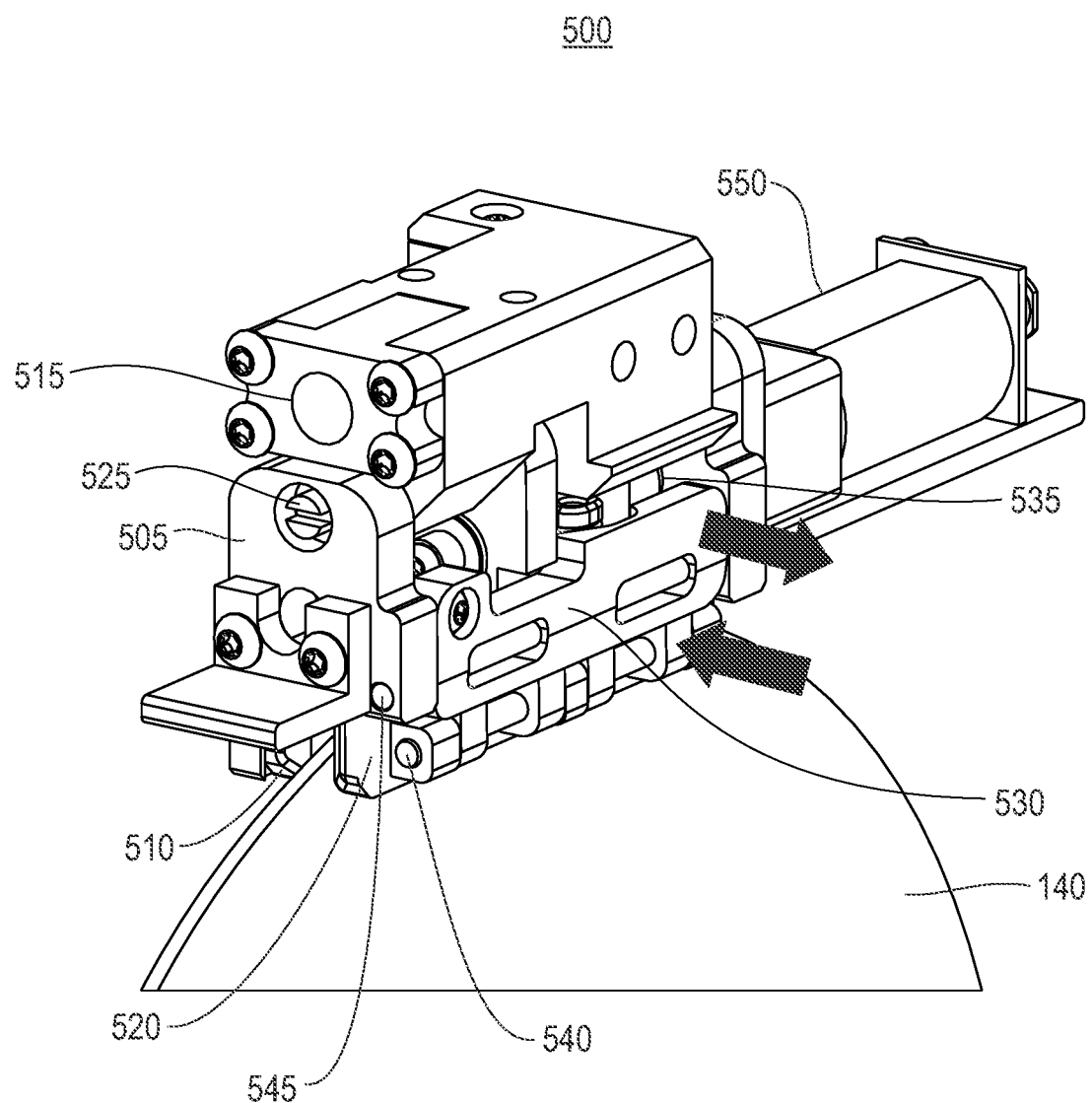
FIG. 5A shows a second disc gripper device shown in a closed state with a disc, according to an embodiment.

FIG. 5A shows a disc gripper device 500 in a closed state with a disc 140, according to an embodiment. In one embodiment, the disc gripper device 500 has lower friction than a disc gripper device 200 (FIGS. 2-4) and provides an even reproducible force on the jaw disc gripping surfaces of a fixed jaw 510 and a moveable jaw 520. In one embodiment, the disc gripper device 500 includes the movable jaw 520 that is connected to a caliper (or rocker, pivoting element, etc.) 530 by a (pivot) shaft 540, which allows the gripping surface of the moveable jaw 520 to align parallel to the disc surface as the caliper 530 presses the moveable jaw 520 against the disc 140 that is in contact with the fixed jaw 510. The disc gripper device 500 further includes a body or housing 505, a motor 550, a gripper translation drive nut 515, a gripper pivot rod 525, and a caliper 530 pivot shaft 545. In one embodiment, the motor 550 causes pivoting of the caliper 530 about an axis parallel to the fixed jaw 510. Therefore, the gripper device 500 is in a closed state once the moveable jaw 520 is moved against the disc 140. The arrows show the pivoting or rotation of the caliper 530 where the lower portion of the caliper 530 moves in while the upper portion moves out, which causes the moveable jaw 520 to press against the disc 140.

In one embodiment, the grip actuator lead screw 535 drives a movable drive nut unit 920 with a roller 930 (FIGS. 9A-B), which presses against a ramp surface 935 of the caliper 530 causing the caliper 530 to rotate (as shown by the arrows in FIG. 5A), thus moving the movable jaw 520 towards the disc 140. In one embodiment, the caliper 530 uses a polished (pivot) shaft 545 and has a low friction for actuation motions.

Figure 5B:
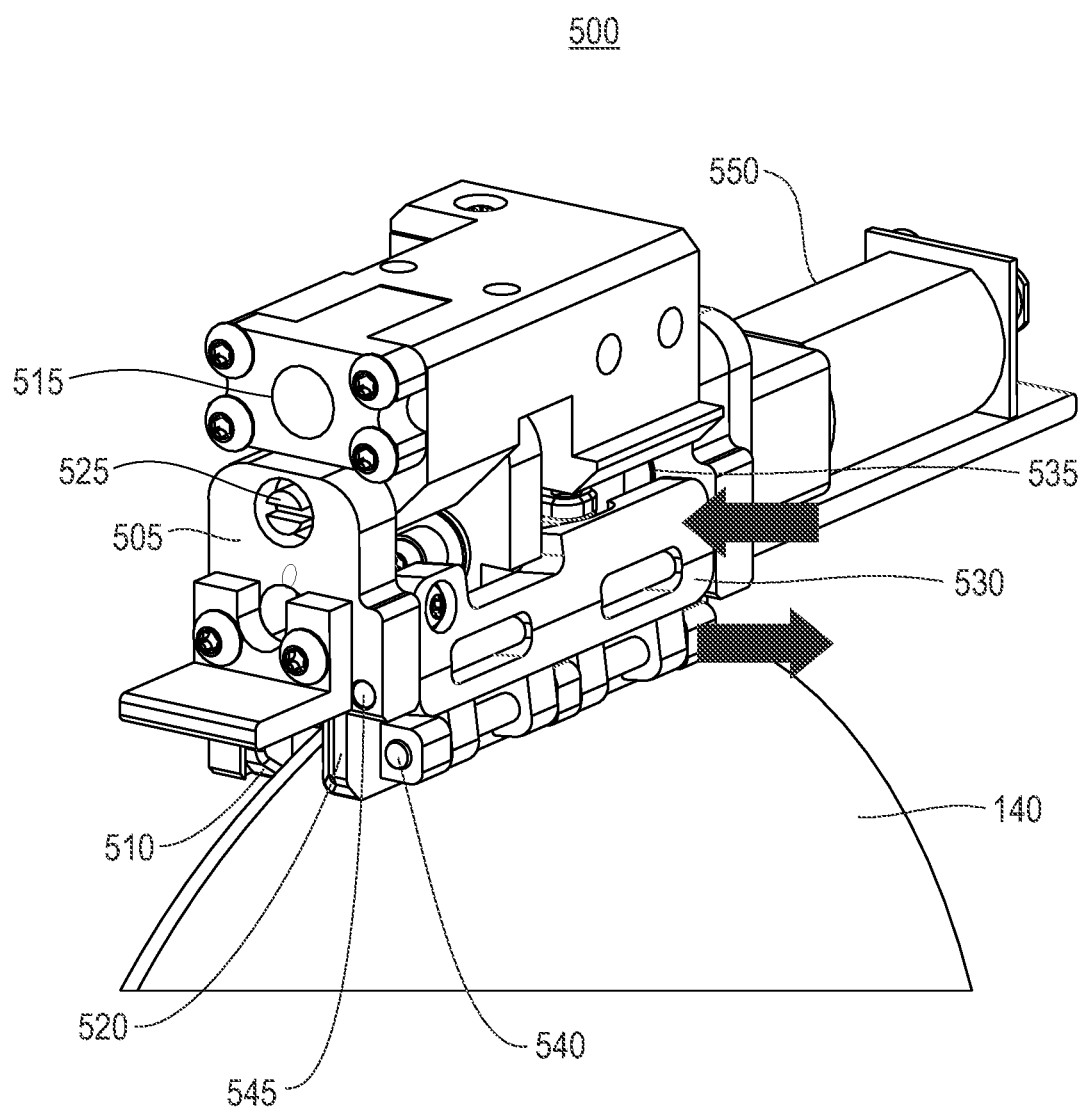
FIG. 5B shows a second disc gripper device shown in an open state with a disc, according to an embodiment.
Figure 6A:
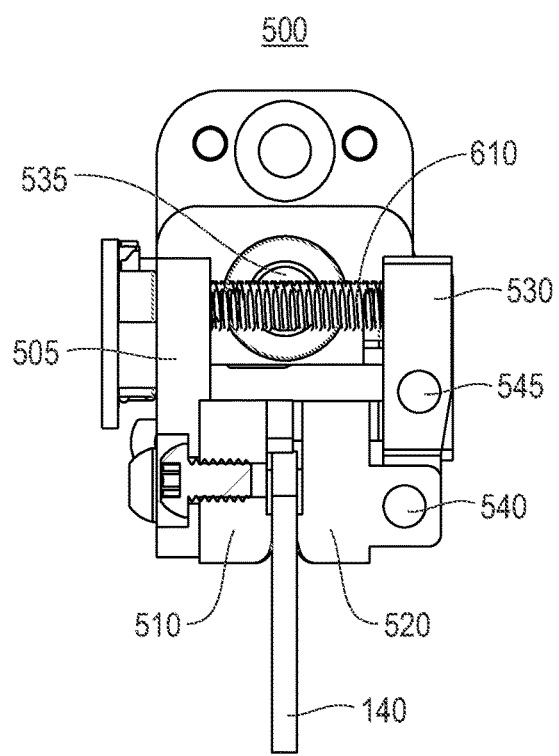
FIG. 6A shows a front view of the disc gripper device of FIG. 5A shown in a closed state with a disc, according to an embodiment.
Figure 6B:
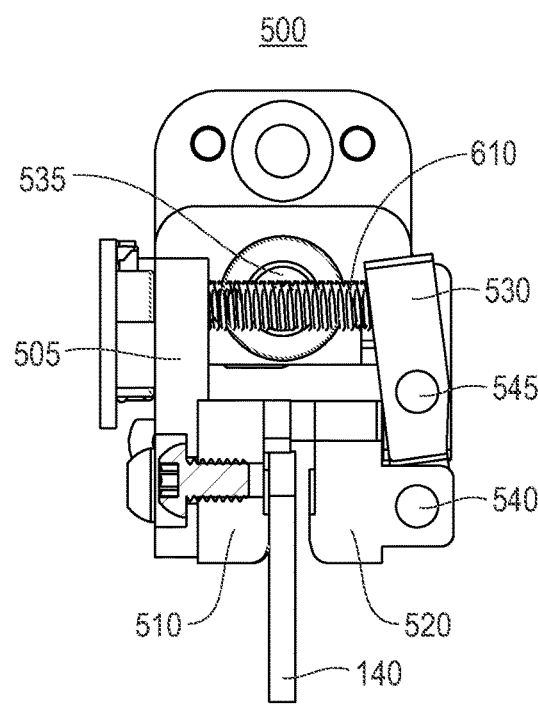
FIG. 6B shows a front view of the disc gripper device of FIG. 5B shown in an open state with a disc, according to an embodiment.

FIG. 5B shows the disc gripper device 500 in an open state with the disc 140, according to an embodiment. When the lead screw 535 moves the roller 930 away from the ramp 935 surface of the caliper 530, the caliper 530 is rotated in the direction of the arrows to its open position by a spring 610 (FIGS. 6A-B). This moves the movable jaw 520 away from the disc 140, which releases the disc 140. The spring 610 acts to release the force on the opposite surfaces of the storage disc 140.

FIG. 6A shows a cross-sectional front view of the disc gripper device 500 of FIG. 5A in a closed state with a disc 140, according to an embodiment. In one embodiment, the spring 610 is extended more in the closed state than when in the open state (see, FIG. 6B). In this closed state, the caliper 530 upper portion rotates away from the disc gripper device 500 while the lower portion of the caliper 530 rotates towards the disc gripper device 500, moving the moveable jaw 520 to press against the disc 140.

FIG. 6B shows a cross-sectional front view of the disc gripper device 500 of FIG. 5B in an open state with the disc 140, according to an embodiment. In one embodiment, the spring 610 is less extended in the open state than in the closed state (see FIG. 6A). In this open state, the caliper 530 upper portion rotates towards the disc gripper device 500 while the lower portion of the caliper 530 rotates away from the disc gripper device 500, moving the moveable jaw 520 to move apart from the disc 140.

Figure 7:
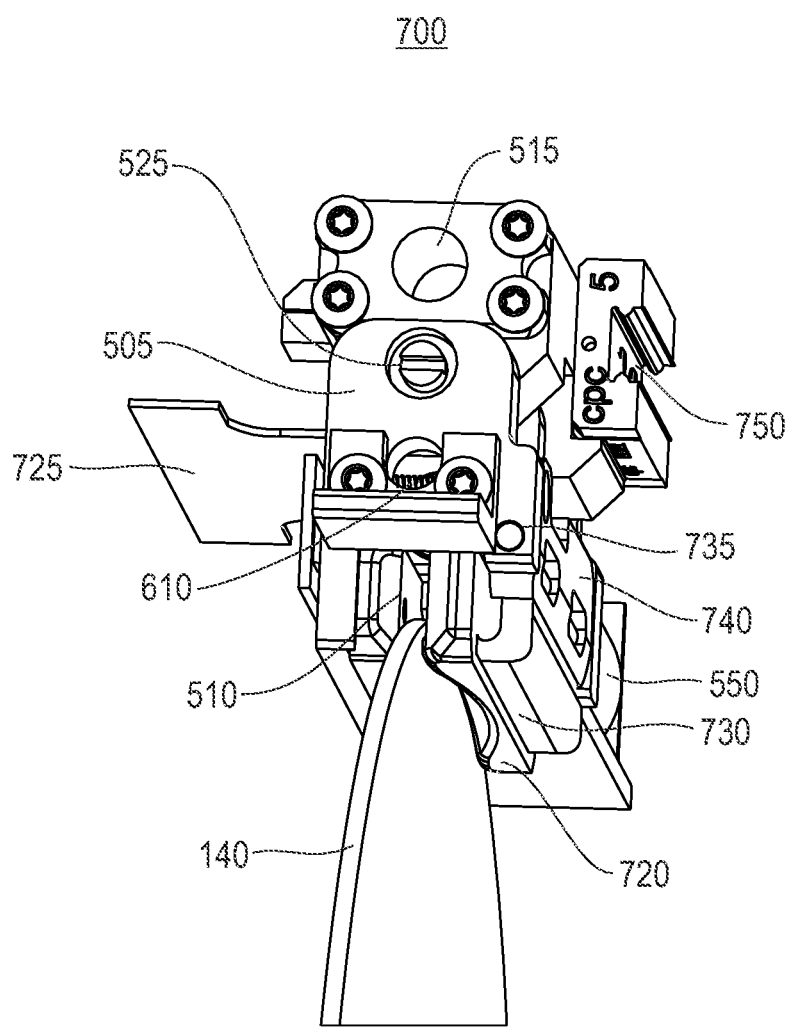
FIG. 7 shows a perspective view of a third disc gripper device shown in a closed state with a disc, according to an embodiment.

FIG. 7 shows a perspective view of another disc gripper device 700 in a closed state with a disc 140, according to an embodiment. In one embodiment, the disc gripper device 700 includes a one-piece combination movable jaw 720, caliper (or rocker element) 740 and incorporated flexure element 730. Similar to the disc gripper device 500 (FIGS. 5A-B, 6A-B), the disc gripper device 700 includes a polished (pivot) shaft 735 and has low friction for actuation motions. In one embodiment, the disc gripper device 700 includes a one-piece combination movable jaw 720 and caliper 740 that incorporates a flexure element 730 to provide a gripping surface of the moveable jaw 720 able to align parallel to the disc surface 140. In one embodiment, a carriage block 750, and an interrupter blade 725 used for lateral position sensing are incorporated. In one embodiment, the one-piece combination movable jaw 720 and caliper 740 that incorporates the flexure element 730 is made of an injection moldable polymer.

In one embodiment, the motor 550 causes pivoting of the one-piece combination movable jaw 720 and caliper 740 that incorporates the flexure element 730 about an axis parallel to the fixed jaw 510. Therefore, the gripper device 700 is in a closed state once the moveable jaw 720 is moved against the disc 140. The pivoting or rotation of the one-piece combination movable jaw 720 and caliper 740 that incorporates the flexure element 730, where the flexure element 730 moves inward while the upper portion of the caliper 740 moves outward, causes the moveable jaw 720 to press against the disc 140.

In one embodiment, the lead screw 535 drives a movable unit with a roller 930 (FIGS. 9A-B), which presses against a ramp 935 surface of the one-piece combination movable jaw 720 and caliper 740 that incorporates the flexure element 730, causing the caliper 740 to rotate thus moving the movable jaw 720 towards the disc 140.

Figure 8A:
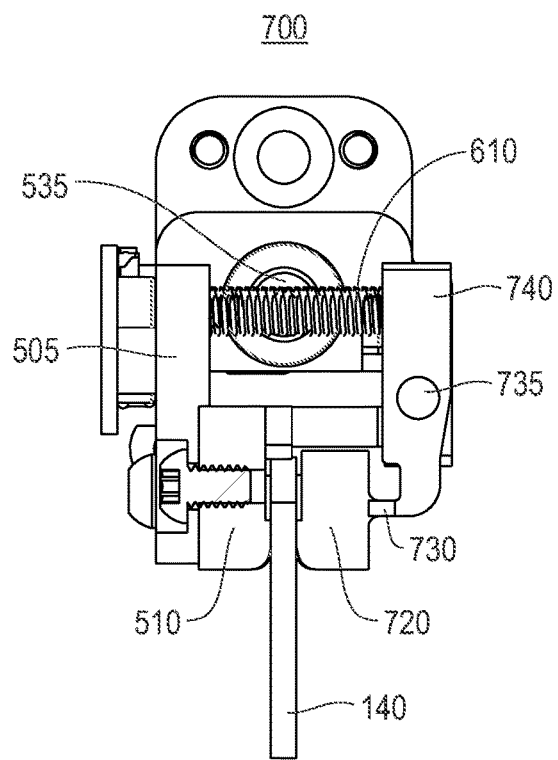
FIG. 8A shows a front view of the disc gripper device of FIG. 7 shown in a closed state with a disc, according to an embodiment.

FIG. 8A shows a front cross-sectional view of the disc gripper device 700 of FIG. 7 in a closed state with a disc 140, according to an embodiment. In one embodiment, the spring 610 is extended more in the closed state than when in the open state (see, FIG. 8B). In this closed state, for the one-piece combination movable jaw 720 and caliper 740 with the flexure element 730, the upper portion rotates away from the disc gripper device 700 while the lower portion rotates towards the disc gripper device 700 causing the moveable jaw 720 to press against the disc 140.

Figure 8B:
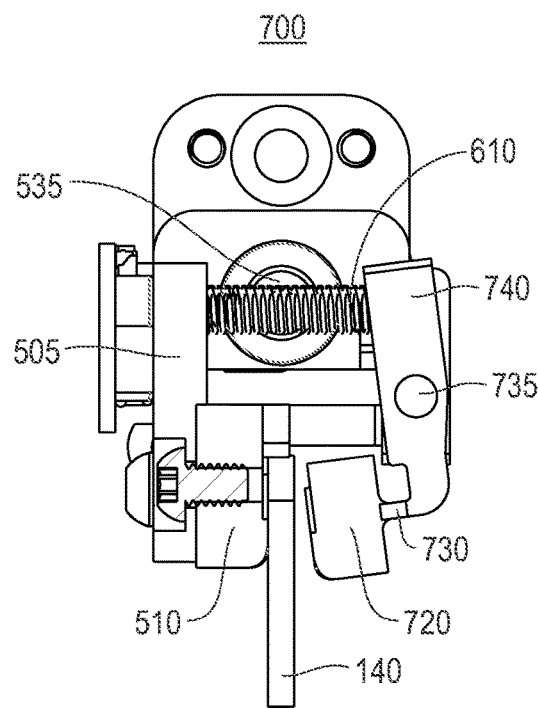
FIG. 8B shows a front view of the disc gripper device of FIG. 7 shown in an open state with a disc, according to an embodiment.

FIG. 8B shows a front cross-sectional view of the disc gripper device 700 of FIG. 7 in an open state with a disc 140, according to an embodiment. In one embodiment, the spring 610 is extended less (i.e., compressed) in the open state than when in the closed state (see, FIG. 8A). In this open state, for the one-piece combination movable jaw 720 and caliper 740 with the flexure element 730, the upper portion rotates towards the disc gripper device 700 while the lower portion rotates away from the disc gripper device 700 causing the moveable jaw 720 to release from contact with the disc 140.

FIG. 9A shows a top cutaway view of the disc gripper device 500 (see, e.g., FIGS. 5A-B, 6A-B) or 700 (see, e.g., FIGS. 7, 8A-B) in an opening state with a disc 140, according to an embodiment. In one embodiment, the moveable jaw 520/720 opening is driven by the roller 930 relieving pressure on a ramp 935 when a roller drive nut 920 is moved to the right by the motorized lead screw 535 (FIGS. 5A-B, FIGS. 9A-9B), relaxing pressure on the caliper 530 (FIGS. 5A-B) or 740 (FIG. 7) and allowing the spring 610 to open the disc gripper device 500/700 movable jaw 520/720. In one embodiment, the limiting sleeve 925 over the lead screw 535 limits motion and provides sensible resistance. In one embodiment, the disc sensor switch 910 senses the disc presence in the disc gripper device 500/700. The gripper device also includes a front limiting sleeve 945 to limit the motion of roller drive nut 920 and provide sensible resistance.

FIG. 9B shows a top cutaway view of the disc gripper device 500 (see, e.g., FIGS. 5A-B, 6A-B) or 700 (see, e.g., FIGS. 7, 8A-B) in a closing state with a disc 140, according to an embodiment. In one embodiment, the moveable jaw 520/720 closing is driven by the roller 930 pressing on a ramp 935 when a roller drive nut 920 is moved to the left (in the direction opposite to that shown in FIG. 9A) by the motorized lead screw 535 (FIGS. 5A-B, FIGS. 9A-9B), placing pressure on the caliper ramp 935 (FIGS. 5A-B) or 740 (FIG. 7), causing the caliper 530/740 to rotate and forcing the disc gripper device 500/700 movable jaw 520/720 to contact and press against the disc 140, which is therefore gripped between the movable jaw 520/720 and fixed jaw 510.

Figure 10A:
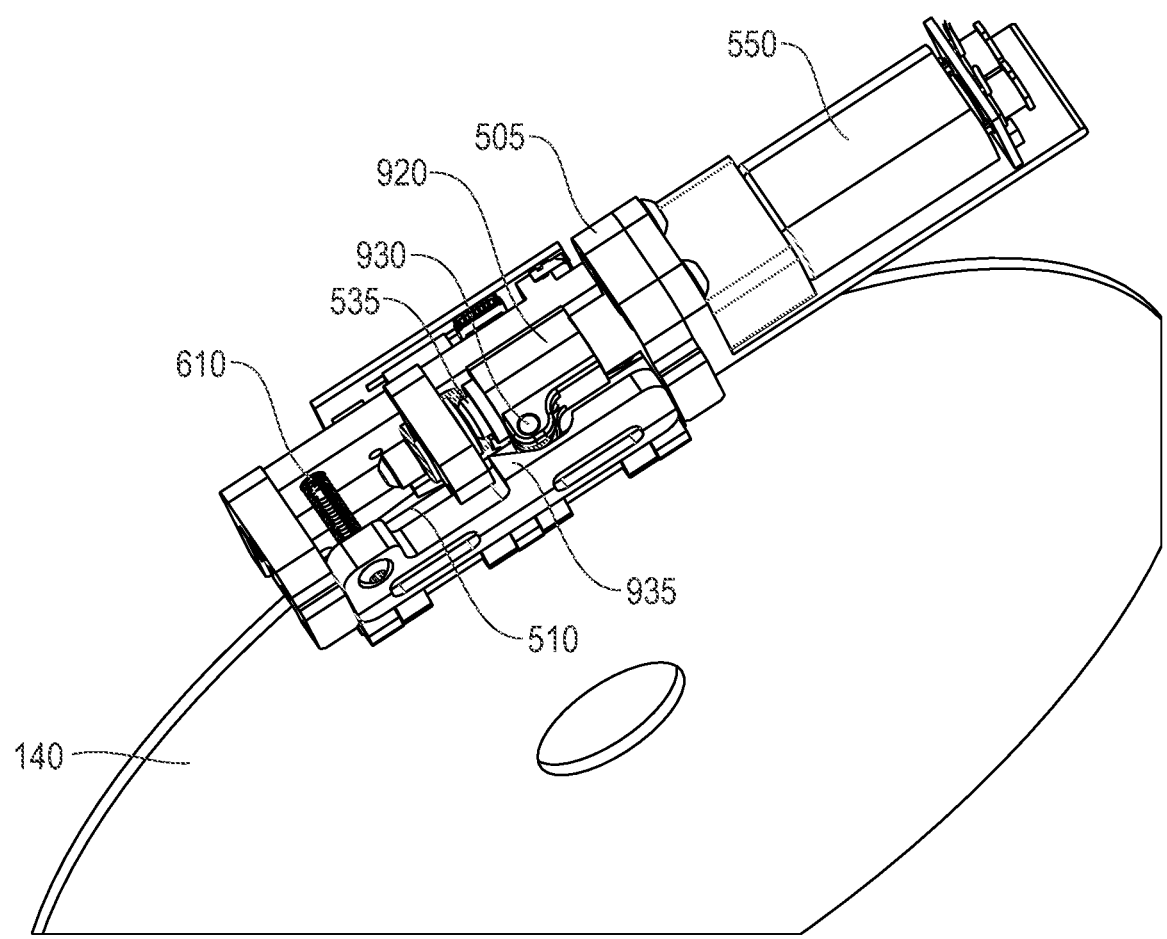
FIG. 10A shows a cutaway top perspective view of the disc gripper device shown in an open state with a disc, according to an embodiment.

FIG. 10A shows a top cutaway perspective view of the disc gripper device 500 (see, e.g., FIGS. 5A-B, 6A-B) or 700 (see, e.g., FIGS. 7, 8A-B) shown in an open state with a disc 140, according to an embodiment. In one embodiment, the roller 930 is moved (to the right) on the lower slope portion of the ramp 935 when the roller drive nut 920 is moved by the motorized lead screw 535 (FIGS. 5A-B, FIGS. 9A-9B), relieving pressure on ramp 935 and allowing spring 610 to open jaws.

Figure 10B:
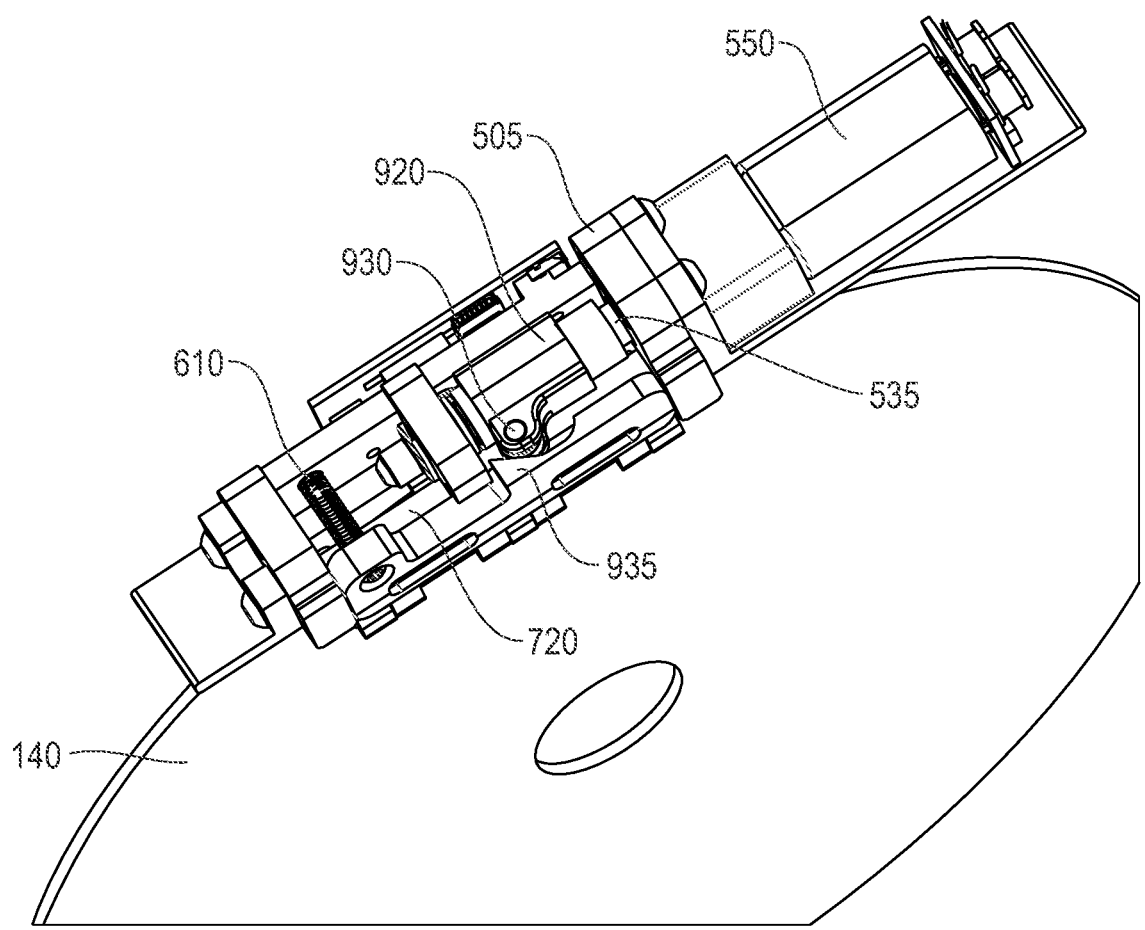
FIG. 10B shows a cutaway top perspective view of the disc gripper device shown in a closed state with a disc, according to an embodiment.

FIG. 10B shows a top perspective view of the disc gripper device 500 (see, e.g., FIGS. 5A-B, 6A-B) or 700 (see, e.g., FIGS. 7, 8A-B) shown in a closed state with a disc 140, according to an embodiment. In one embodiment, the roller 930 is moved (to the left) on the upper slope portion of the ramp 935 when the roller drive nut 920 is moved by the motorized lead screw 535 (FIGS. 5A-B, FIGS. 9A-9B), increasing pressure on ramp 935 and causing jaws to close on disc 140.

Figure 11:
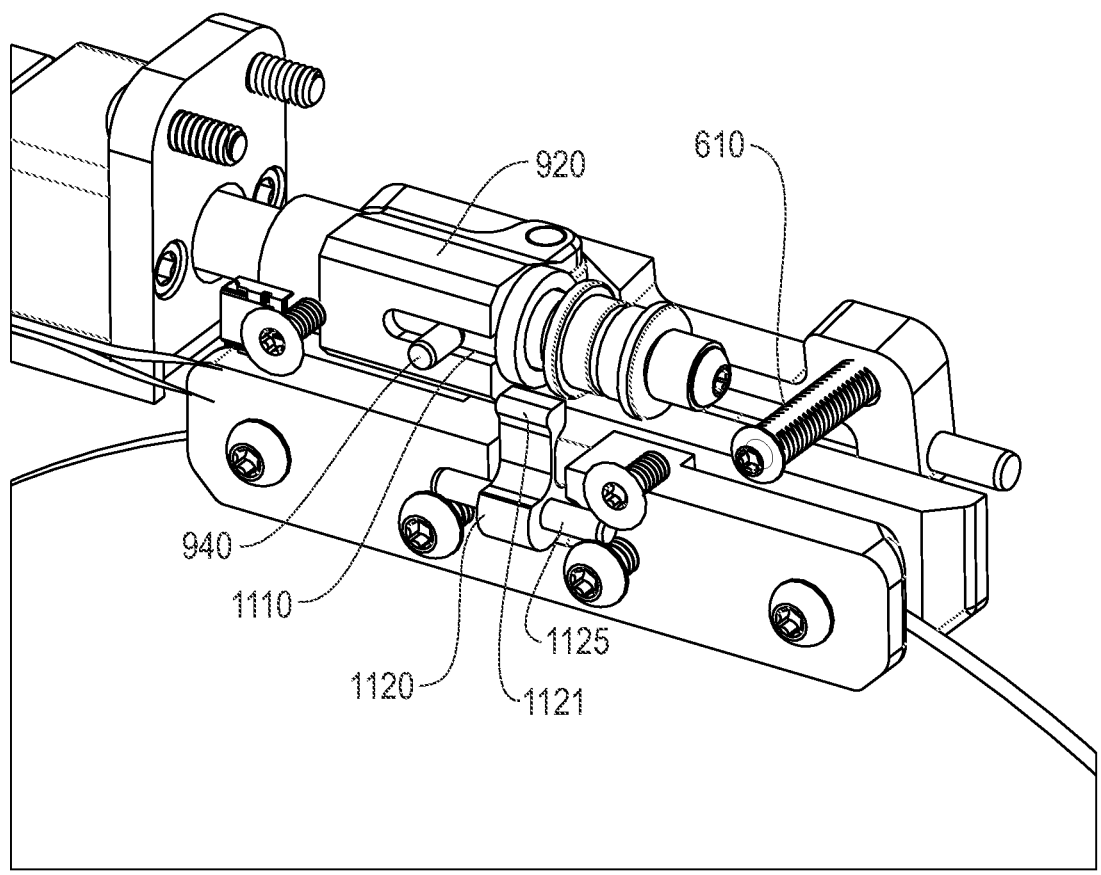
FIG. 11 shows a perspective internal view of the disc gripper device, according to an embodiment.

FIG. 11 shows a perspective internal view of the disc gripper device 500 (see, e.g., FIGS. 5A-B, 6A-B) or 700 (see, e.g., FIGS. 7, 8A-B), according to an embodiment. In one embodiment, the disc gripper device 500/700 includes an anti-rotation pin 940 (FIG. 9A-B) in the disc gripper 500/700 body wall that engages a groove 1110 in the roller drive nut 920. In one embodiment, the sensor actuator 1120 pivots/rotates via the sensor actuator pivot pin 1125 when a disc contacts lever 1422 (see FIG. 14), which causes sensor actuator lever tip 1121 to contact and actuate a disc sensor switch 910 (e.g., a momentary switch or sensor), thus indicating the presence or absence of a disc 140 in the disc gripper device 500/700. In one embodiment, sensor actuator 1120 incorporates a flexure portion between the pivot axle 1125 and the sensor lever tip 1121 such that when a disc moves lever portion 1422 to its limiting ("disc present") position, the tip 1121 presses on the sensor switch with force adequate to activate it, but the tip travel distance does not exceed the travel allowed for the sensor switch.

Figure 12A:
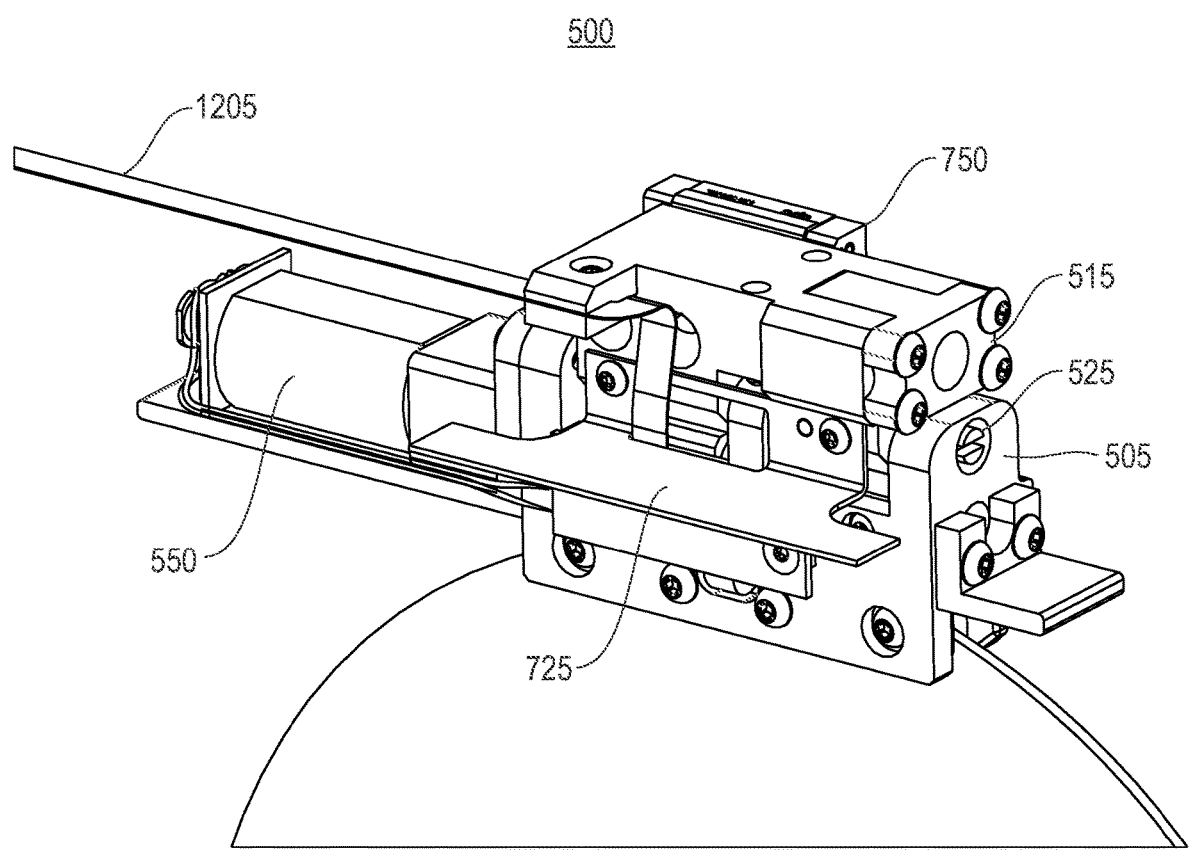
FIG. 12A shows a right-side perspective view of the disc gripper device shown in FIGS. 5A-B, according to an embodiment.
Figure 12B:
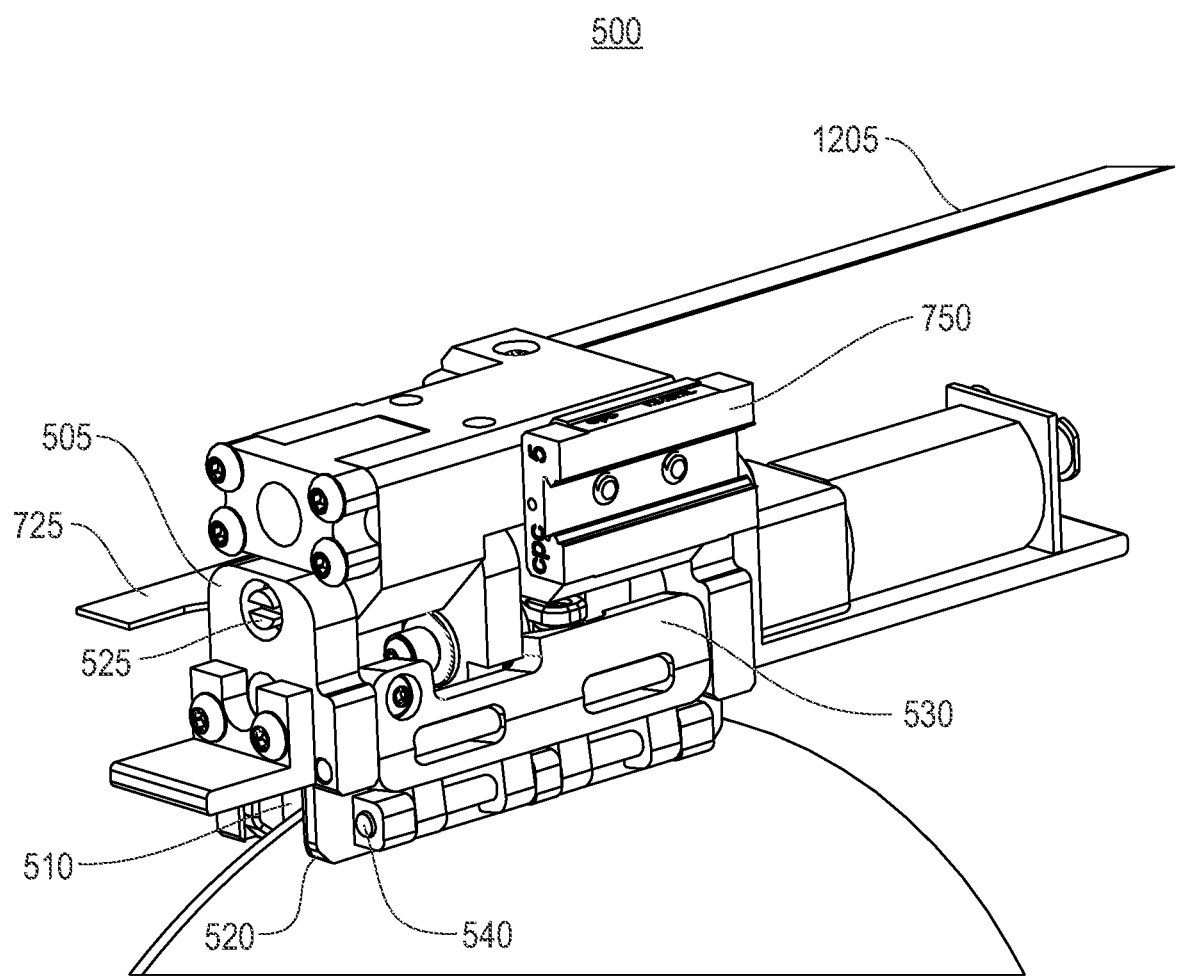
FIG. 12B shows a left-side perspective view of the disc gripper device shown in FIG. 12A, according to an embodiment.

FIG. 12A shows a right-side perspective view of the disc gripper device 500 of FIGS. 5A-B, according to an embodiment. In one embodiment, the gripper device 500 (or gripper device 700, FIG. 7) includes a flex cable 1205 used for power distribution and communicating a disc present signal. FIG. 12B shows a left-side perspective view of the disc gripper device 500 shown in FIG. 12A, according to an embodiment.

Figure 13A:
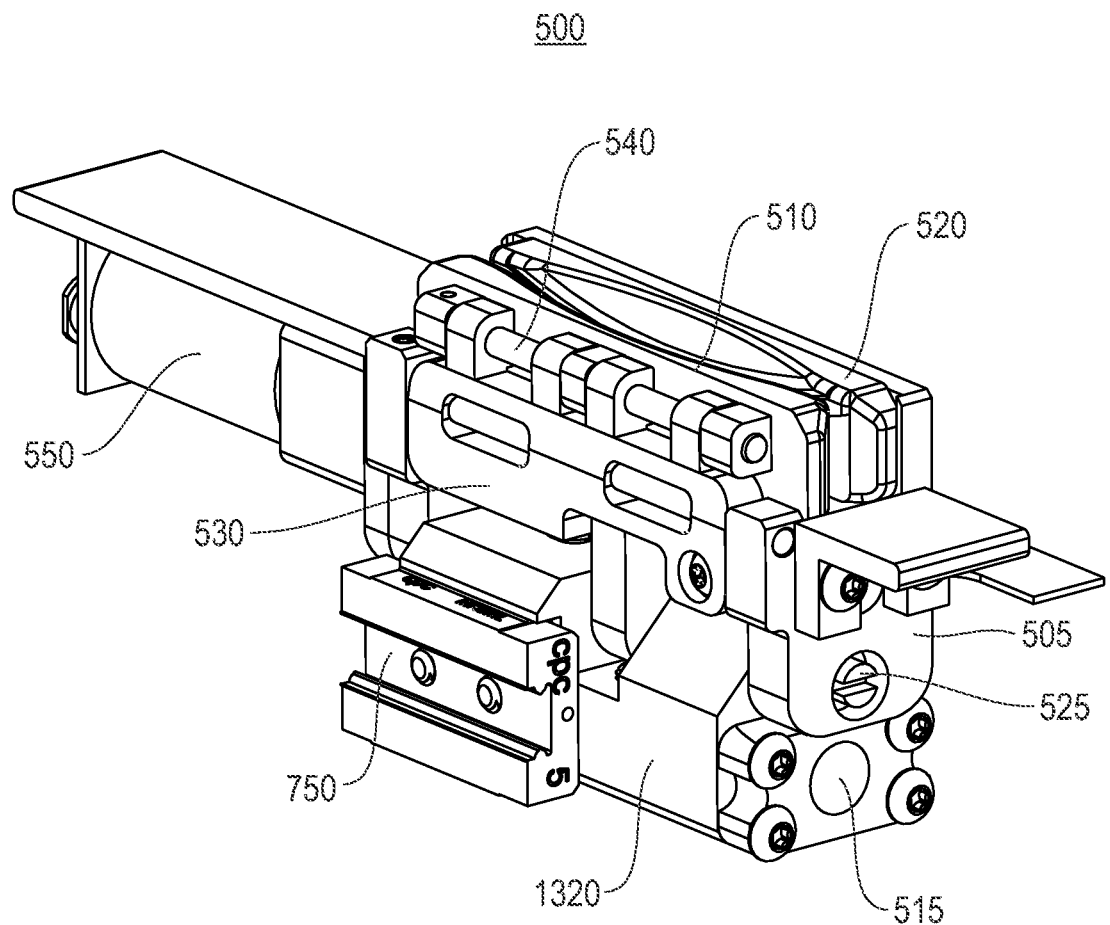
FIG. 13A shows a bottom left-side perspective view of the disc gripper device shown in FIG. 12B, according to an embodiment.

FIG. 13A shows a bottom left-side perspective view of the disc gripper device 500 of FIG. 12B, according to an embodiment. In one embodiment, the shaft 540 is used to mount the moveable jaw 510 and provides for controlled pivoting of the caliper 530 and the moveable jaw 510. In one embodiment, the housing 505 pivots slightly about pivot shaft 525 providing a disc 140 to align to guide grooves. The upper body 1320 portion of the disc gripper 500 has its orientation fixed by the carriage block 750.

Figure 13B:
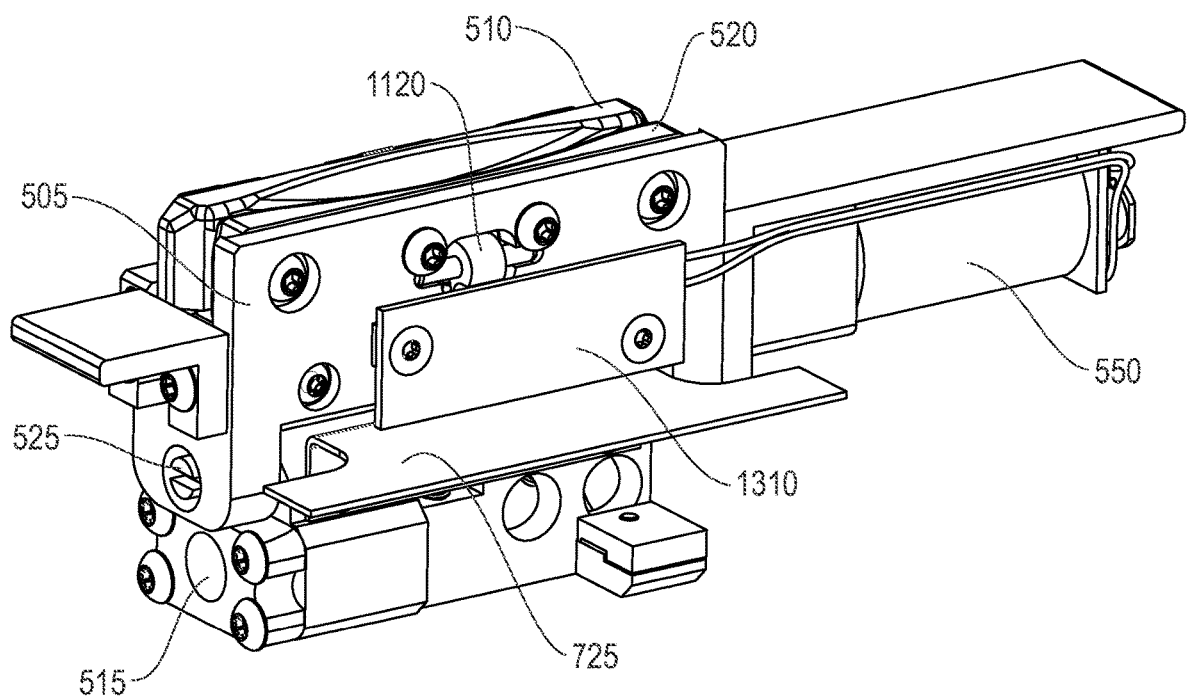
FIG. 13B shows a bottom right-side perspective view of the disc gripper device shown in FIG. 12A, according to an embodiment.

FIG. 13B shows a bottom right-side perspective view of the disc gripper device 500 of FIG. 12A, according to an embodiment. In one embodiment, the sensor actuator 1120 rotates to activate the switch 910 (disc present indicator switch, FIG. 14). The switch 910 is connected to a disc present indicator switch printed circuit board (PCB) 1310.

Figure 14:
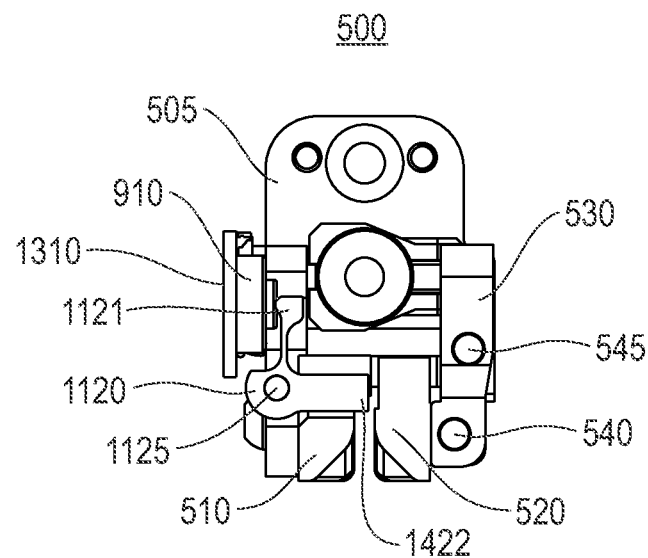
FIG. 14 shows a front cross-sectional internal view of the disc gripper device shown in FIGS. 5A-B, according to an embodiment.

FIG. 14 shows a front cross-sectional view of the disc gripper device 500 in FIGS. 5A-B, according to an embodiment. The sensor actuator 1120 pivots on the sensor actuator pivot pin 1125. Based on the sensor actuator 1120 pivot, the lever 1121 contacts the switch 910 when a disc 140 contacts the lower portion 1422 of the sensor actuator 1120 when entering the disc gripper device 500 (or disc gripper device 700, FIG. 7). The disc makes such contact with the lower portion 1422 between the fixed jaw 510 and the moveable jaw 520 (or moveable jaw 720 (FIG. 7) for the disc gripper device 700). In one embodiment, flexure of the lever 1121 allows over-stroke and wider actuation range.

Figure 15:
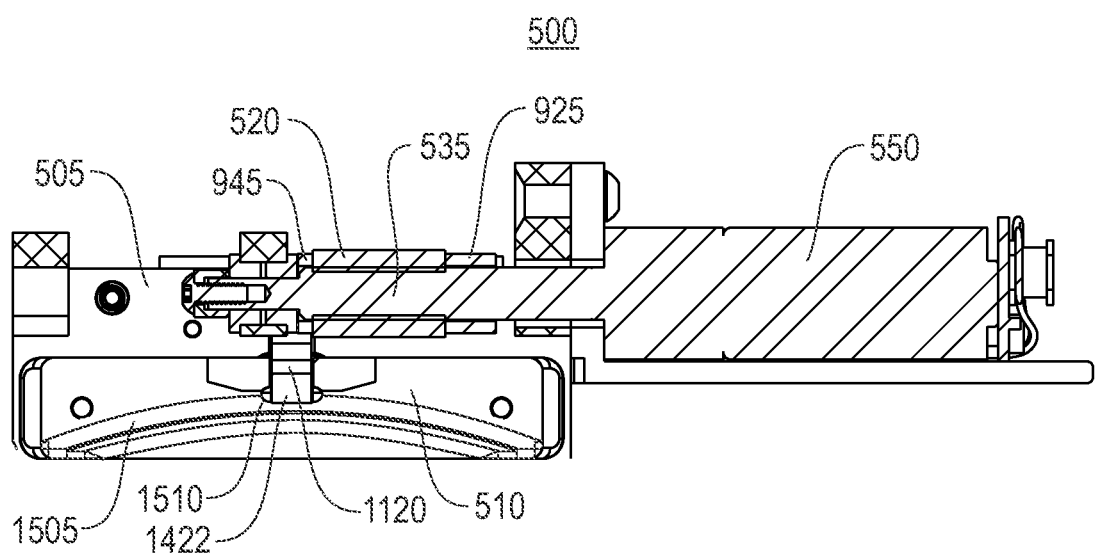
FIG. 15 shows a left-side cross-sectional internal view of the disc gripper device shown in FIG. 14, according to an embodiment.

FIG. 15 shows a left-side cross-sectional view of the disc gripper device 500 in FIG. 14, according to an embodiment. In one embodiment, the fixed jaw 510 includes an opening 1510 for the sensor actuator 1120 lower portion 1422. The fixed jaw 510 includes a disc contact face 1505 that grips a disc 140.

Figure 16A:
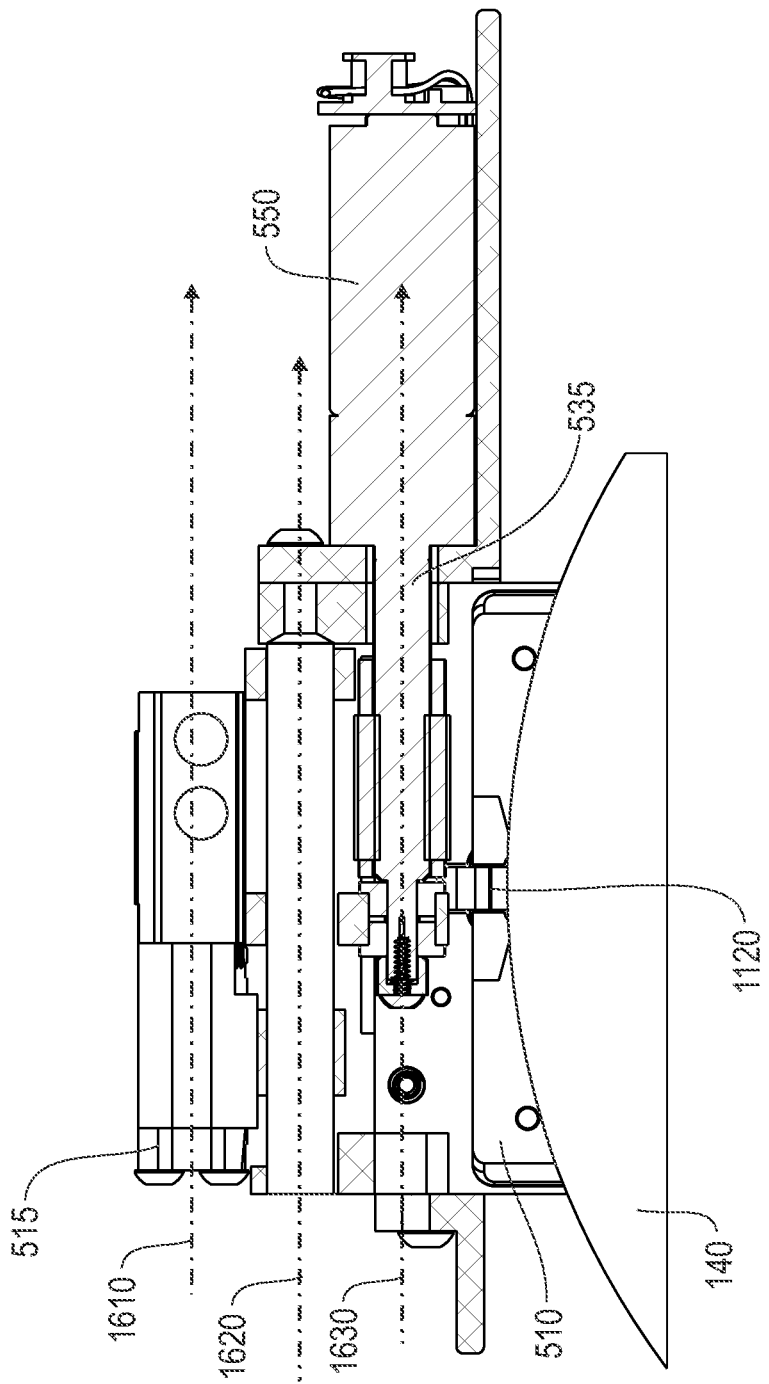
FIG. 16A shows a left-side cross-sectional internal view of the disc gripper device showing lateral-drive axis, gripper pivot axis and grip actuator motor axis, according to an embodiment.

FIG. 16A shows a left-side cross-sectional view of the disc gripper device 500 (see, e.g., FIGS. 5A-B, 6A-B) or 700 (see, e.g., FIGS. 7, 8A-B), illustrating a lateral-drive lead screw nut 515 (see, e.g., FIGS. 5A-B, 9A-9B) with axis 1610, a gripper pivot axis 1620 and a grip actuator motor 550 and lead screw 535 axis 1630, according to an embodiment.

Figure 16B:
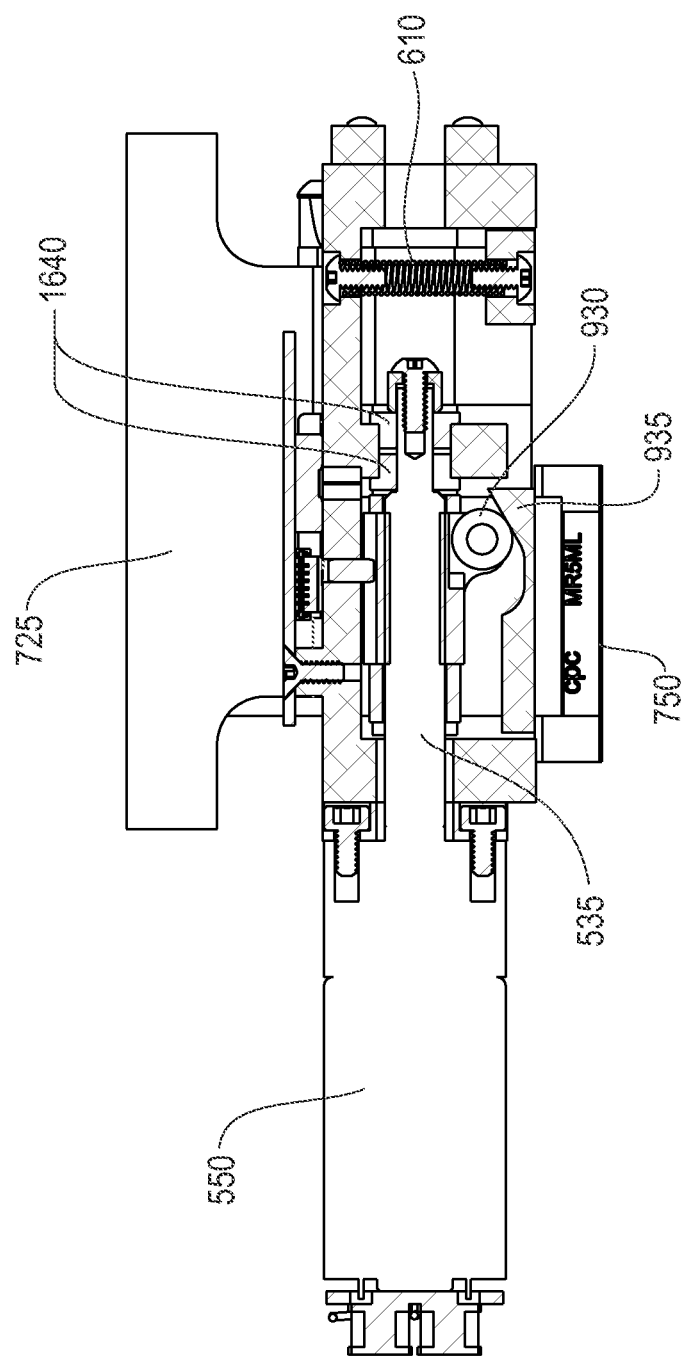
FIG. 16B shows a top cross-sectional internal view of the disc gripper device showing motor output shaft bearings, roller driven by motor and ramp on pivoting element, according to an embodiment.

FIG. 16B shows a top cross-sectional view of the disc gripper device 500 (see, e.g., FIGS. 5A-B, 6A-B) or 700 (see, e.g., FIGS. 7, 8A-B), illustrating motor output shaft bearings 1640, the roller 930 that is driven by the motor 550 on the ramp 935 using a pivoting element (e.g., a shaft, bearing, etc.), according to an embodiment.

Figure 17:
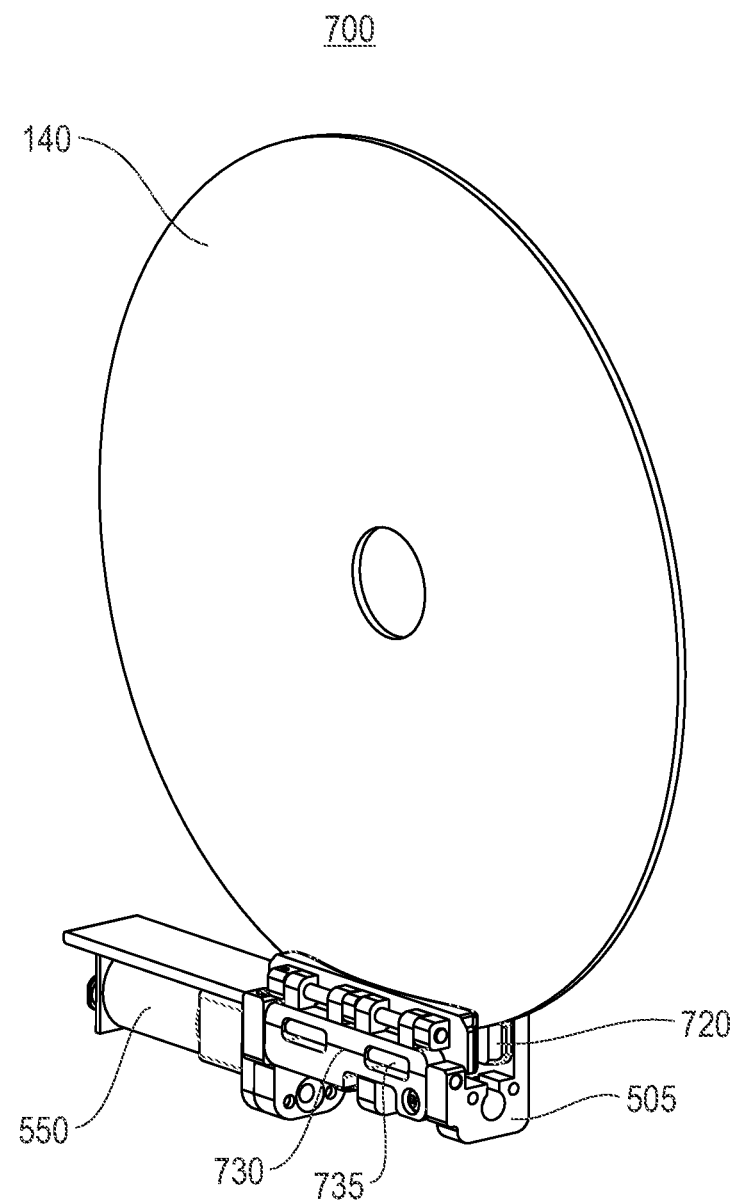
FIG. 17 shows a bottom perspective view of the disc gripper device shown in FIG. 7 shown in a closed state with a disc, according to an embodiment.
Figure 18:
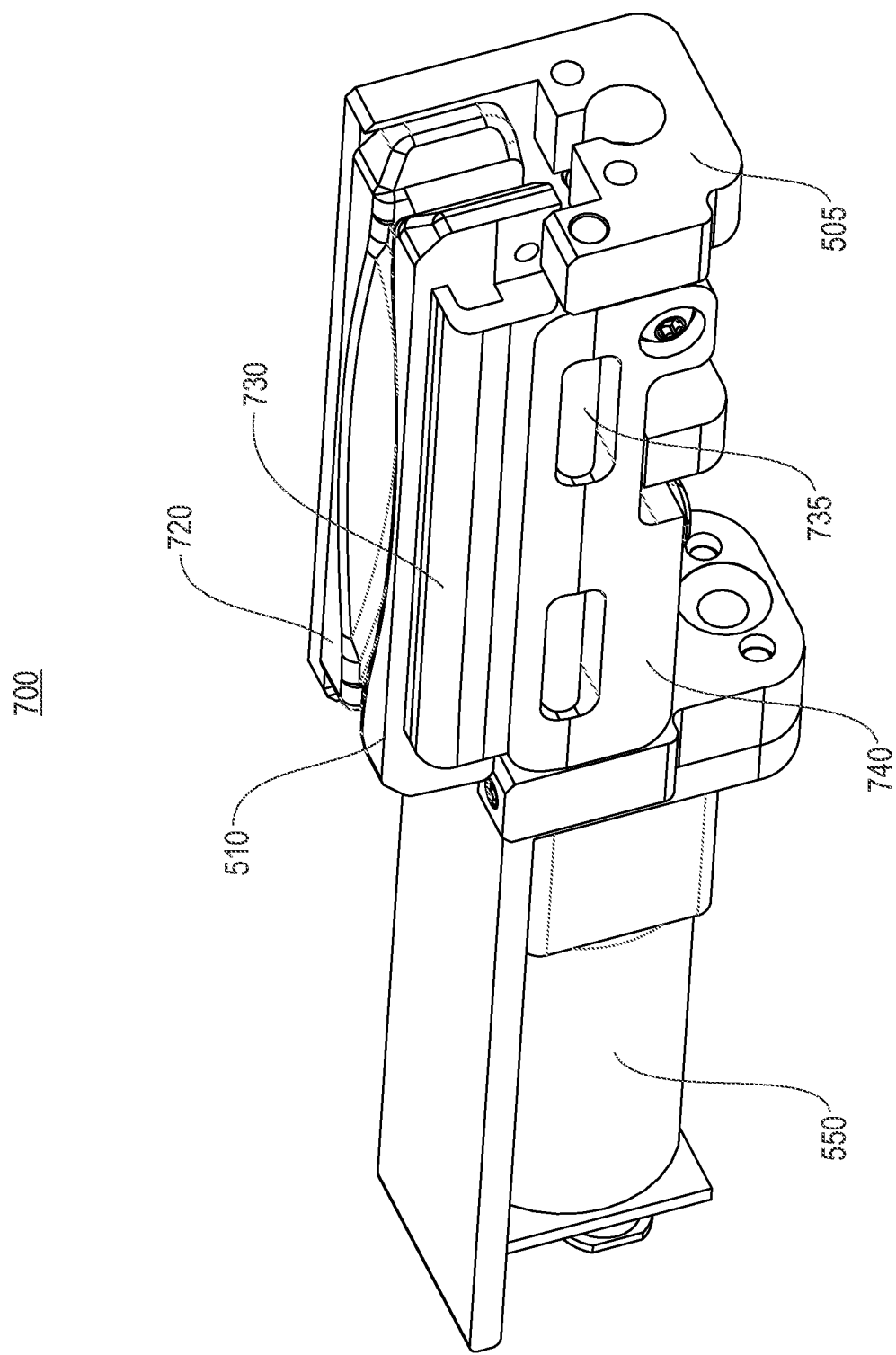
FIG. 18 shows a bottom perspective view of the disc gripper device shown in FIG. 7 shown without a disc, according to an embodiment.

FIG. 17 shows a bottom perspective view of the disc gripper device 700 in FIG. 7 in a closed state with a disc 140, according to an embodiment. FIG. 18 shows a bottom perspective view of the disc gripper device 700 in FIG. 7 without a disc 140, according to an embodiment. It will be well understood that other driving mechanisms may be used for the disc gripper device 500 (see, e.g., FIGS. 5A-B, 6A-B) or the disc gripper device 700 (see, e.g., FIGS. 7, 8A-B), such as solenoids, springs, etc.

Figure 19:
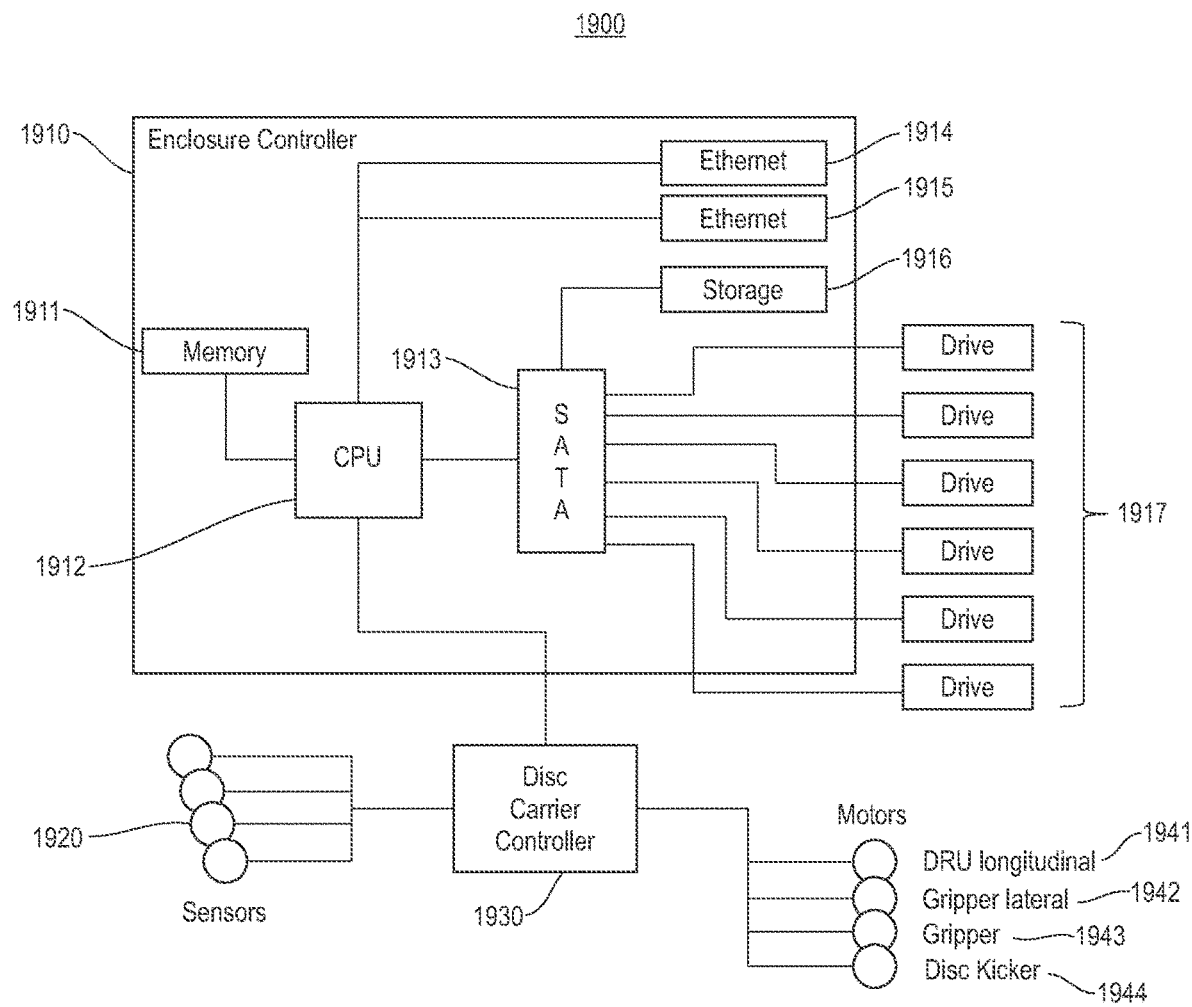
FIG. 19 shows control circuitry and electronics that may be implemented for the disc gripper devices of FIGS. 5A-B and 7 for the high performance optical storage system of FIG. 1, according to an embodiment.

FIG. 19 shows control circuitry and electronics 1900 that may be implemented for the disc gripper device 500 (see, e.g., FIGS. 5A-B, 6A-B) and the disc gripper device 700 (see, e.g., FIGS. 7, 8A-B) for the high performance optical storage system 100 of FIG. 1, according to an embodiment. In one embodiment, optical sensors of the sensor set 1920 are used in the system to provide contactless position information for various moving components. In one example, optical sensors of the sensor set 1920 on the disc carrier of the DRU 125 combined with the features of the disc cassettes 150 and the disc drives 130 allow the disc gripper device 500 or 700 to be positioned to within +−0.1 mm. Other sensors of the sensor set 1920 are used to sense the location of a disc kicker device of the DRU 125, whether a disc (e.g., storage disc 140, FIG. 1) is in the disc gripper device 500 or 700, the lateral position of the disc gripper device 500, 700, etc. Sensors of the sensor set 1920 may be used in concert with features on the disc cassettes 150 to facilitate positioning of the DRU 125 at disc locations. Other examples include referring to the discs themselves. Similarly, features may be disposed on the enclosure 110 or the disc drives 130 to facilitate accurate positioning of the DRU 125 when loading and unloading discs 140 from the disc drives 130. In another example, transmissive photo-interrupter sensors may be utilized for position state sensing of the various components. The motors used in the system may be of the brushless DC type, optionally with shaft encoders to aid in position determination. In one example, the motors may include the DRU 125 longitudinal motor(s) 1941, the disc gripper device 500 or 700 lateral motor(s) 1942, the disc gripper device 500 or 700 motor 1943 (also referring to motor 270, FIG. 2, motor 550, FIGS. 5A-B, 9A-B, 10A-B, 12A, 13A-B, 15, 16A-B, 17 and 18), the disc kicker device motor(s) 1944, etc.

In one embodiment, the control electronics shown in the control circuitry and electronics 1900 are partitioned into a robotic controller (the disc carrier controller 1930) on the disc carrier and an enclosure controller 1910 otherwise mounted in the enclosure 110 (FIG. 1). The latter does not move, and includes a CPU 1912, memory 1911 and associated components for running the control software. In one example the control circuitry and electronics 1900 includes local storage for holding the operating system and the control software, although in another example may instead boot over a network and load the necessary software, or even boot off the optical media of a disc. In another example, flash memory storage is implemented. The enclosure controller 1910 includes both the external interface to a host system or network as well as interfaces (SATA 1913, storage interface 1916) to the disc drives 130, collectively shown as a set 1917. In one example, the external interface may include a network interface, such as Ethernet. In one embodiment, for enhanced reliability, the network interface would include two connections, such as Ethernet connections 1914 and 1915 with each directed to a separate switch. In another example, a third external interface might be used for system control and monitoring.

In one embodiment, the enclosure controller 1910 is responsive to commands over the external interface to load a disc 140, read and write data, and perform other operations. In one example, the enclosure controller 1910 communicates with the robotic controller (disc carrier controller 1930) to send commands, such as to load a selected disc 140 (FIG. 1) in a selected disc drive 130. The enclosure controller 1910 also includes a data buffer for holding read and write data during data transfers.

In one embodiment, the robotic controller (disc carrier controller 1930) manages the robotic activities of the high performance optical storage system 100, including controlling the motors, reading optical and other sensor data and communicating state information with the enclosure controller 1910. In one embodiment, the robotic controller (disc carrier controller 1930) communicates with the enclosure controller 1910 over a serial interface. The interface may be wired, such as universal serial bus (USB) over a flex cable, or wireless, such as infrared data association (IRDA), BLUETOOTH®, etc. In one example, on initialization, it is critical for the disc carrier controller 1930 to determine the physical state of the high performance optical storage system 100 to prevent damage. If the high performance optical storage system 100 has undergone a controlled shutdown, this state information may be recorded within the library. Even so, this shutdown state needs to be confirmed. The high performance optical storage system 100 may have been powered down in an unknown state, such as by an unintended power loss. For example, before the DRU 125 can move longitudinally, the high performance optical storage system 100 must determine if a disc is in the disc gripper device 500 or 700 and if so, position the disc gripper device 500 or 700 within the drive carrier prior to a longitudinal move. In one embodiment, the sensors set 1920 includes sensors to detect if the disc gripper device 500 or 700 is centered, or to the left or right of center. Thus, the disc gripper device 500 or 700 can be moved directly to the center position. Similarly, sensors of the sensor set 1920 are provided to determine if the disc kicker device is centered, or to the left or right of center. Once both disc gripper device 500 or 700 and disc kicker device are centered, the DRU 125 may be moved longitudinally. All these functions are accomplished through means of the set of sensors 1920. In one embodiment, optical sensors are used to make the position determinations.

In one embodiment, the high performance optical storage system 100 determines if discs are located within any of the disc drives 130. The disc drives 130 may be queried to see if a disc is loaded and spindle of a disc drive 130 clamped. It is possible for a disc to remain in a disc drive 130 but not be clamped by the spindle. This can be tested by attempting a clamp operation.

In one embodiment, an inventory manger is implemented that includes metadata for each disc 140 in the high performance optical storage system 100. In one example, the metadata may include the media type, bad block table or other initialization information, location of the disc within the enclosure 110, etc. The high performance optical storage system 100 can transmit this initialization information to a disc drive 130 upon the load operation, which substantially shortens the startup time. The inventory manager also queries the disc drive 130 on unload to obtain updates to the media.

In one example, metadata, such as changes in the bad block information, is stored by the inventory manager in nonvolatile storage which may be external to the high performance optical storage system 100. Any system metadata can be periodically flushed to specific locations on the media in the library to create self-described system state, such as for relocating a system. Alternatively, the metadata may be stored on other nonvolatile media in the enclosure controller 1910.

In one embodiment, the high performance optical storage system 100 software includes a library executive, which is responsive to read, write, mount and dismount commands from a host system. The library executive forwards mount and dismount commands and information to the disc carrier controller 1930. The mount command information includes the disc location in the disc cassette 150 to select and the disc drive 130 to load. The dismount command information includes information on the disc drive 130 to unload and the target location for storing the disc 140 in the disc cassette 150.

As will be appreciated by one skilled in the art, aspects of the embodiments may be a system, a method, and/or a computer program product at any possible technical detail level of integration. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

Aspects of the embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the various embodiments with various modifications as are suited to the particular use contemplated.

What is claimed is:

1. An apparatus comprising:
   a motor configured to drive a driving element within a housing;
   a pivoting element on a shaft coupled to the housing, the pivoting element being coupled to a moveable jaw device and configured to force the moveable jaw device at a given moment towards or away from a face of a storage disc, as the pivoting element pivots about a first axis;
   a fixed jaw device coupled to the housing;
   wherein the moveable jaw device and the fixed jaw device form a gripper device configured to clamp a particular portion of opposite first and second surfaces of a storage disc; and
   a disc sensor configured to sense presence of the storage disc between the moveable jaw device and the fixed jaw device,
   wherein the moveable jaw device is configured to rotate about a second axis parallel to the first axis such that a contact face of the moveable jaw device rotates to lie flat against a first surface of the storage disc upon gripping of the storage disc between the moveable jaw device and the fixed jaw device.

2. The apparatus of claim 1, wherein:
   power is applied to the motor to move the driving element at any given time to release or to grip the storage disc by the gripper device; and
   the storage disc remains released or clamped in the absence of power applied to the motor.

3. The apparatus of claim 1, comprising:
   a spring that acts to release the forces on the opposite surfaces of the storage disc; wherein:
   the driving element comprises a drive screw configured to move a drive-nut incorporating a roller that contacts a ramp on the pivoting element, thereby generating opposing forces from the moveable jaw device and the fixed jaw device on the opposite surfaces of the storage disc.

4. The apparatus of claim 1, wherein the disc sensor comprises a spring lever activating a momentary switch to indicate the presence or absence of the storage disc in the gripper device.

5. The apparatus of claim 3, further comprising a pin protruding from a body wall of the gripper device, wherein the pin is configured to engage a groove in the drive-nut to prevent the drive nut from rotating around a driving element axis.

6. The apparatus of claim 1, wherein:
   a flexure portion is coupled between the pivoting element and the moveable jaw; and
   the pivoting element, the flexure portion, and the moveable jaw are integrated into a single device.

7. An apparatus comprising:
   a fixed jaw device;
   a moveable jaw device; and
   a pivoting element coupled to the moveable jaw device, the pivoting element configured to force the moveable jaw device toward the fixed jaw device at any given moment towards or away from a face of a storage disc, as the pivoting element pivots about a first axis;
   wherein:
   the moveable jaw device pivots with respect to the pivoting element about a second axis parallel to that of the pivoting element;
   the fixed jaw device is disposed such that the moveable jaw device and the fixed jaw device form a gripper device configured to clamp a particular portion of a storage disc; and
   a contact face of the moveable jaw device rotates to lie flat against a first surface of a storage disc upon gripping the storage disc between the moveable jaw device and the fixed jaw device.

8. The apparatus of claim 7, further comprising a disc sensor configured to sense the presence of the storage disc between the moveable jaw device and the fixed jaw device.

9. The apparatus of claim 8, wherein:
   the particular portion comprises a data-free surface of the storage disc; and
   the gripper device is configured to clamp and release the storage disc in a disc storage system.

10. The apparatus of claim 8, wherein:
    power is applied to a motor to move a driving element at any given time to release or to grip the storage disc by the gripper device; and
    a storage disc remains released or clamped in the absence of power applied to the motor.

11. The apparatus of claim 10, wherein the driving element comprises a drive screw configured to move a drive-nut incorporating a roller that:

contacts a ramp surface on the pivoting element, and
causes the pivoting element to rotate and generate opposing forces on opposite surfaces of the storage disc.

12. The apparatus of claim 11, further comprising a pin protruding from a body wall of the gripper device, wherein the pin engages a groove in the drive-nut to prevent the drive-nut from rotating around a driving element axis.

13. The apparatus of claim 8, wherein:
a flexure portion is coupled between the pivoting element and the moveable jaw; and
the pivoting element, the flexure portion, and the moveable jaw are integrated into a single device.

14. An apparatus, comprising:
a motor configured to drive a driving element within a housing;
a caliper coupled to the housing and configured to force a first jaw device toward a second jaw device based on movement of the driving element; and
a disc sensor configured to sense presence of a storage disc between the first jaw device and the second jaw device, wherein the first jaw device and the second jaw device form a gripper device configured to clamp a particular portion of a storage disc comprising an arc segment along an outer edge of adjacent surfaces of the storage disc;
wherein:
the first jaw device is attached to the caliper and is configured to move at any given moment towards or away from a face of a storage disc, as the caliper pivots about a first axis;
the first jaw device is coupled to the caliper such that the first jaw device rotates within a second axis parallel to the first axis, and a contact face of the first jaw device is configured to rotate to lie flat against the face of a storage disc upon gripping of the storage disc by the gripper device; and
the second jaw device is fixed to the housing.

15. The apparatus of claim 14, wherein the caliper is a rocker element that pivots about a shaft fixed to the housing, and a shaft axis is parallel to a face of the second jaw device.

16. The apparatus of claim 15, wherein a spring rotates the rocker element, such that the first jaw device moves away from the storage disc upon movement of the driving element to open the gripper device.

17. The apparatus of claim 16, wherein the disc sensor comprises:
an actuator element that pivots about a pin fixed in the housing; and
a momentary switch configured such that upon the actuator element being contacted by an edge of a storage disc, the actuator element presses on the momentary switch indicating presence of a storage disc in the gripper device.

18. The apparatus of claim 17, wherein the driving element comprises a drive screw configured to move a drive-nut incorporating a roller that:
contacts a ramp surface on the pivoting element, and
causes the rocker element to rotate and generate opposing forces on opposite surfaces of a storage disc.

19. The apparatus of claim 18, wherein the pin engages a groove in the drive-nut to prevent the drive-nut from rotating around a driving element axis.

* * * * *